(12) United States Patent
Christandl et al.

(10) Patent No.: US 10,960,573 B2
(45) Date of Patent: Mar. 30, 2021

(54) METHOD FOR MANUFACTURING A CURABLE, SLAB-LIKE LIGHT-CONDUCTING BODY, MOLD FOR CARRYING OUT THE METHOD AND A LIGHT-CONDUCTING BODY PRODUCED IN ACCORDANCE WITH THE METHOD

(71) Applicants: Dieter Christandl, Weiz (AT); Josef Christandl, St. Ruprecht/Raab (AT); Robert Hofer, St. Ruprecht/Raab (AT)

(72) Inventors: Dieter Christandl, Weiz (AT); Josef Christandl, St. Ruprecht/Raab (AT); Robert Hofer, St. Ruprecht/Raab (AT)

(*) Notice: Subject to any disclaimer, the term of this patent is extended or adjusted under 35 U.S.C. 154(b) by 0 days.

(21) Appl. No.: 16/639,580

(22) PCT Filed: Aug. 6, 2018

(86) PCT No.: PCT/EP2018/071228
§ 371 (c)(1),
(2) Date: Feb. 16, 2020

(87) PCT Pub. No.: WO2019/030154
PCT Pub. Date: Feb. 14, 2019

(65) Prior Publication Data
US 2020/0298445 A1    Sep. 24, 2020

(30) Foreign Application Priority Data
Aug. 7, 2017 (DE) .................. 10 2017 117 820

(51) Int. Cl.
*B28B 23/00* (2006.01)
*B28B 7/00* (2006.01)
(Continued)

(52) U.S. Cl.
CPC ........ *B28B 23/0037* (2013.01); *B28B 7/0097* (2013.01); *B28B 7/285* (2013.01);
(Continued)

(58) Field of Classification Search
CPC .............. B28B 23/0037; B28B 7/0097; B28B 23/0056; B28B 23/0062; B28B 5/08; E04C 2/04; E04C 2/54
See application file for complete search history.

(56) References Cited

U.S. PATENT DOCUMENTS 1,661,007 A    2/1928   Payne
9,211,653 B2 * 12/2015  Christandl .......... B28B 19/0015
(Continued)

FOREIGN PATENT DOCUMENTS

DE    102008046769 A1    3/2010
DE    202015002273 U1    11/2015
(Continued)

*Primary Examiner* — Tracie Y Green
(74) *Attorney, Agent, or Firm* — Browdy and Neimark, P.L.L.C.

(57) ABSTRACT

A method for manufacturing a curable light-conducting body (21) in a casting method, in particular for the manufacture of light-conducting bodies (21) of a curable concrete material (36, 56), wherein a light-conducting mat (1) is embedded in a curable casting material (36, 56), and a casting mold (27) with a recessed mold cavity (18) open at the top is filled with the not-yet-cured casting material (36, 56), wherein, in a first method step, a plurality of molding punches (32) moveably arranged in the mold cavity (18) of the casting mold (27) are moved to at least the plane of the upper edge (43) of the mold cavity (18), 1. in a second method step, the space between the molding punches (32) in the mold cavity (18) is filled with a curable casting material (36), 2. in a fifth method step, the light-conducting mat (1) to be embedded in the casting material (36, 56) is placed on the end sides (61) of the molding punches (32) raised in the mold cavity (18), 3. and that, in a sixth method step, the light-conducting mat (1) is pressed into the casting material (36, 56) wherein, with the pressing movement of the light-conducting mat (1) into the casting material (36, 56), the
(Continued)

molding punches (32) are approximately synchronously moved downwards out of the bottom surface of the mold cavity (18).

8 Claims, 17 Drawing Sheets

(51) Int. Cl.
  *B28B 7/28* (2006.01)
  *E01C 5/06* (2006.01)
  *E04C 2/04* (2006.01)
  *E01C 17/00* (2006.01)
  *C04B 2/00* (2006.01)
  *F21V 8/00* (2006.01)
  *E04B 2/00* (2006.01)

(52) U.S. Cl.
  CPC ...... *B28B 23/0056* (2013.01); *B28B 23/0062* (2013.01); *E01C 5/06* (2013.01); *E01C 17/00* (2013.01); *E04B 2/00* (2013.01); *E04C 2/04* (2013.01); *G02B 6/0075* (2013.01); *E04B 2103/02* (2013.01)

(56) References Cited

U.S. PATENT DOCUMENTS 10,162,099 B2 * 12/2018 Christandl ................ E04C 1/42
10,365,423 B2    7/2019 Christandl et al.

FOREIGN PATENT DOCUMENTS

JP      H01235769 A    9/1989
JP      2006142555 A    6/2006

* cited by examiner

METHOD FOR MANUFACTURING A CURABLE, SLAB-LIKE LIGHT-CONDUCTING BODY, MOLD FOR CARRYING OUT THE METHOD AND A LIGHT-CONDUCTING BODY PRODUCED IN ACCORDANCE WITH THE METHOD

The invention relates to a method for the production of a curable, slab-like light-conducting body, a mold for carrying out the method and a light-conducting body produced in accordance with the method.

The invention relates to its own prior art in accordance with the subject matter of WO2016/150454A1.

The cited reference discloses a light-conducting body consisting of an injection-molded mat in which light-conducting channels are incorporated. In FIGS. 19 to 25, the manufacture of a curable light-conducting body is generally described comprising a light-conducting mat embedded in the material of the light-conducting body. However, the reference does not disclose any technical teaching on how, in an industrial method, the production of such a curable light-conducting body could be achieved in accordance with the subject matter of WO2016/150454A1.

It is therefore the object of the present invention to provide a method which makes it possible to achieve, on an industrial scale, the production of the light-conducting body described in WO2016/150454A1.

The invention also has the object of providing a mold suitable for carrying out the method, and further a light-conducting body produced in accordance with the method according to the present invention and realized with the mold according to the present invention.

To achieve the above objects, the invention is characterized by a method in accordance with the subject matter of claim 1.

In accordance with independent claim 5, a special casting mold platen is provided, in the bottom of which a number of slots are arranged in a grid, in which a plurality of molding punches are arranged to be raisable and lowerable.

Furthermore, the subject matter of independent claim 9 has the characteristic that the light-conducting body consists of a curable concrete material in which the light-conducting mat is embedded in a manner that is safe in operation and protected against breakage.

When, in the following description of the invention, it is discussed that the light-conducting body according to the present invention is manufactured in a casting method and a curable casting material is used therefor, this is intended to mean in a preferred exemplary embodiment that it is a curable concrete material.

Although, in the following description, the manufacture of a light-conducting body is only described with reference to a curable concrete material, the invention is not limited thereto.

It can be provided that instead of a curable concrete material, other pourable, curable casting materials are used, such as polyurethane plastics or pourable foamed plastics or polyamides or polyacrylics.

PDMA plastics and the like are also considered suitable plastic material compositions.

It is only for reasons of easier description that, in the following, the manufacture of a curable light-conducting body is described in the manner of a concrete paving stone or a concrete slab, although the invention is not limited thereto.

The most common method for the manufacture of concrete slabs is the hermetic production process. It is suitable for thicker slabs of a thickness of about 4 to 12 cm. Manufacture takes place mostly in a rotary indexing table press having seven, sometimes only five, stations. Herein, two different types of concrete are used. The relatively low-viscosity facing concrete and the very dry backing concrete (also called core concrete) are two preferred casting materials. The facing concrete later forms the visible upper surface of the slab and is individually designed with respect to its color and grain size. A uniform concrete type is usually used for the backing concrete (core concrete).

Therefore, when a light-conducting body is produced in the manner of a concrete slab, the facing concrete is first filled into the mold and distributed by means of vibrating. Then, the backing concrete (core concrete) is filled in and the entire filling is compacted by means of pressing (mostly in two steps). The high pressure of up to 1200 tons causes that part of the humidity migrates from the facing concrete to the backing concrete thus resulting in the two layers homogeneously bonding. After opening the mold, the rough slab, or the concrete paving stone, is removed and placed on a pallet of metal, wood or plastic and transported to a storeroom for the concrete to cure.

As a second method for the manufacture of the light-conducting body according to the invention, a wet pressing method is claimed which is similar to the hermetic production process wherein, however, only a single type of concrete is used. This allows very thin concrete slabs to be produced. Since the concrete has a relatively low viscosity when it is filled in, most of the water must be able to drain from the mold during the pressing process.

Certain light-conducting plates are also cast in molds (such as of polyurethane) and only removed after curing. This is a so-called wet cast method. To avoid shrinkage cracks during curing, it is provided according to an embodiment of the invention to add fibers to the concrete. This is called fiber concrete. The fibers absorb the tensile stresses occurring during curing and thus enable the production of large slabs.

When the bottom of the mold is not smooth but has a pattern, this is transferred onto the finished concrete slab in the manner of a relief. This allows, for example, the production of different structures on the visible side of the light-conducting body, in particular, also the outward appearance of a sandstone.

By injecting additional paint prior to filling the backing concrete (core concrete) a marble effect can be achieved.

In the direct flushing process, the produced light-conducting slabs are processed with a high-pressure water jet directly after removal from the press. Herein, the fine components of the concrete can be removed from the surface, while the rougher grain remains intact.

If the bottom of the mold is lined with paper soaked in a curing delaying agent (e.g. sugar) the front side of the slab cannot cure. After curing of the concrete, the paper and the non-hardened concrete residue can be removed by brushing and with the aid of water. This results in the classical washed concrete.

After curing, the light-conducting bodies produced as concrete stones or concrete slabs can be further processed in various ways. The most important options are:
  grinding,
  sandblasting with or without previous grinding. Partial areas of the plate surface can also be sandblasted with the use of templates while others remain unprocessed,
  rumbling, that is the mechanical knocking of the slab surface with a kind of hammer,
  processing the edges, such as by the grinding of chamfers, pickling for the removal of cement residue or the achievement of a greater roughness of the surface, spray coating to increase resistance against soiling and weather.

When light-conducting bodies are produced from a pourable concrete material it has been found that it is extraordinarily difficult to integrate the breakage-prone plastic light-conducting mat, which usually consists of a grid, into the concrete material in a manner that is safe against breakage and positionally secured.

There have been numerous attempts undertaken by the applicant to anchor the breakage-prone light-conducting mat in the mold and to ensure that the light-conducting mat does not break as a result of the subsequent high pressure after filling in the core concrete.

According to the present invention, therefore, the method steps 1 to 4 in accordance with the subject matter of the independent claim 1 are carried out.

It is important that a plurality of molding punches are arranged to be raisable and lowerable in the mold cavity of the casting mold, wherein it is preferred when the molding punches extend through associated slots in the bottom surface of the mold cavity and can thus be arranged in the mold cavity in a height-adjustable manner.

The molding punches, in their profiling, their shape and their number, should correspond to the plate-like light-conducting elements of the light-conducting mat, which form the grid-like light-conducting mat with associated longitudinal and transverse rods.

It is thus provided according to the present invention that the molding punches, in their profile and their dimensioning correspond to the profile and number of plate-like light-conducting elements and that, in the first method step, first the molding punches extending upwards into the mold cavity through the bottom surface of the mold cavity are raised to thus fill the mold cavity prior to its filling with the casting material.

In the second method step, the space between the molding punches in the mold cavity is filled with a curable casting material.

This is claimed in a general form in the subject matter of claim 1, although it is provided in an embodiment that, in this second method step, a facing concrete is filled in as a curable casting material. This is a low-viscosity concrete that is now uniformly distributed between the prong-like or comb-like molding punches in the mold cavity thus to fill the bottom surface of the mold cavity up to a height of ⅕, for example.

It is now crucial that, in the third method step, the light-conducting mat to be anchored in the casting material is placed, with its plate-like light-conducting elements, on the end sides of the molding punches raised in the mold cavity, and is fixed in a positionally secure manner.

The positional securing can be provided by mutually engaging tongue and groove connections or by means of tabs which engage in associated recesses on the light-conducting element.

This is how the approximately plate-like light-conducting elements are placed on the end sides of the molding punches in a positionally secure manner and retained there.

Subsequently, the core concrete is filled in and also uniformly distributed between the prong-like or comb-like molding punches in the mold cavity. Additional vibrating or other distributing tools may, however, also be used.

Now it is important that, after filling in the core concrete, the light-conducting mat with its light-conducting elements is now placed on the end faces of the raised molding punches and positionally secured there. This is followed by the crucial anchoring process of the breakage-prone light-conducting mat in the still liquid casting material, whereby the light-conducting mat is pressed onto the molding punches with a light pressure exerted on the light-conducting mat and, at the same time the molding punches are moved downwards out of the slots of the bottom surface of the mold cavity.

The molding punches thus form a preceding template and keep a free space in the core concrete for the light-conducting elements of the light-conducting mat penetrating the core concrete, in this way these light-conducting elements are pressed into spaces in the core concrete held free by the molding punches thus enabling anchoring of the entire light-conducting mat in the core concrete in a manner secure against breakage.

The actual displacing work is thus performed by the molding punches. The breakage-prone light-conducting elements and the longitudinal and transverse webs connecting the latter thus no longer have to perform any displacement work in the viscous core concrete because this displacement work was realized beforehand by the molding punches preceding the light-conducting elements in the casting material.

The elements of the light-conducting mat are thus copied by the shape of the molding punches, and the molding punches of metal precede the pressing movement of the light-conducting mat in the core concrete so that the molding punches form the placeholders for the parts of the light-conducting mat penetrating the core concrete.

Such a sequence of steps in the method has made it possible for the first time to anchor the breakage-prone light-conducting mat, which usually consists of a thin transparent plastic material, in the viscous core concrete in a manner secure against breakage.

As soon as the molding punches have been completely withdrawn from the bottom surface of the mold cavity the parts of the light-conducting mat attached to the end faces of the molding punches have also arrived at the bottom of the mold cavity thus also having penetrated the low-viscosity-layer of the facing concrete. This concludes the embedding process of the light-conducting mat in the core concrete and the facing concrete.

Then the top pressing plunger, which has resulted in the light-conducting mat following the receding molding punches, is moved upwards.

In an embodiment of the invention it can be additionally provided—as described in the general descriptive portion—that the thus produced casting material with the embedded light-conducting mat is compacted at a pressure of 1200 tons with a high pressure force and an associated pressing plate without there being a risk of the parts of the breakage-prone light-conducting mat, now embedded in the core concrete, breaking.

It is thus possible for the first time to produce highly compacted concrete slabs and concrete paving stones with embedded light-conducting mats, which hitherto has not been possible.

A mold for carrying out the method is characterized in that, in the bottom of the casting mold platen, a plurality of slots are arranged in a grid, which perforate the bottom, and in that a plurality of molding punches are arranged to be raisable and lowerable in the slots, wherein the number and the profiling of the molding punches corresponds to the number and profiling of the light-conducting elements of the light-conducting mat, so that each of the light-conducting elements of the light-conducting mat has a molding punch associated with it, that has approximately the same shape. Such a mold thus ensures that the raisable and lowerable molding punches precede the elements of the light-conducting mat when they are pressed into the core concrete to thus create recesses in the core concrete for the parts of the light-conducting mat which subsequently penetrate therein.

A light-conducting body made in accordance with the method according to the invention using a mold according to the invention is thus characterized by a curable concrete material in which a light-conducting mat is embedded, the light-conducting elements of which are visible at the visible side at least at their ends, and one or more light-generating elements are arranged at its back.

The production steps are therefore carried out as follows:
1. The mold with extended punches is filled with facing concrete and smoothed.
2. The mold is filled with core concrete and smoothed. If a single type of concrete is used, steps 1 and 2 are combined.
3. The light-conducting mat formed as an injection-molded part is placed on the upper mold and pressed onto the mold. During the pressing process the molding punches move downwards until they are flush with the bottom of the mold.

The upper mold must be precisely adapted to the injection-molded part so that the injection-molded part does not break during the pressing and vibrating process.

Together with the present invention, several further methods are claimed as essential to the invention, which are the subject matter of independent claims 11, 14 and 15.

The above-mentioned further subject matters of the present invention are intended to be protected both alone and in combination with any of the other independent claims.

This also applies to the subject matter of independent claim 1 which is intended to be protected alone and/or in any combination with the other independent claims 11, 14, 15.

In accordance with the subject matter of independent claim 11, it is provided that, in a first method step, a light-conducting mat is fixed at the bottom of a casting mold, that, in a second method step, the casting mold is filled with a curable casting material until the light-conducting mat is embedded in the curable casting material, that, in a third method step, filling of the casting mold with the curable casting material is continued until there is an overfill of the casting material over the embedded light-conducting mat, and that, in a fourth method step, a pressing plate is pressed on the overfill into the mold cavity of the casting mold open at the top and at least partially displaces the overfill and thereby compacts the casting material.

Such a method is particularly suitable for the single-layer concrete method and is based on the fact that the light-conducting mat with all light-conducting channels (into which the light is fed) is placed in the casting mold in a downward direction. Herein, a retaining structure or a retaining profile corresponding to the light channels of the light-conducting mat to be held free can also be provided at the bottom of the mold so that the light-conducting mat can be anchored at the bottom of the casting mold in a positionally correct manner and erroneous installation is not possible.

Subsequently, concrete is poured into the casting mold. The filling level is about 10 percent higher than the height of the finished slab. Subsequently, a pressing plate comprising recesses completely perforating the pressing plate is pressed into the casting mold from the top and compacts the concrete material.

Vibrating can be additionally performed in order to better compact the concrete and to avoid air inclusions. The overfilled concrete on the light conductors is not pressed. This overfilled concrete is drained to the outside through slots perforating the pressing plate. Then the non-pressurized concrete is removed (precisely above the light-conducting mat) and the slab-like light-conducting body is thus complete.

In an extension to the present method, it may be provided that a negative mold, preferably of metal, is arranged at the bottom of the casting mold, on which the light-conducting mat is fitted to thus achieve a positionally accurate fixing at the bottom of the casting mold.

This negative mold for fixing the light-conducting mat can also be omitted, however.

The use of such a negative mold is the subject matter of independent claim 14 which differs from independent claim 11 by the fact that first the light-conducting mat is anchored at the bottom of the casting mold on a retaining profile fixed at the bottom to thus ensure correctly positioned association of the light-conducting mat in the curable casting material.

In accordance with the subject matter of independent claim 15, a method differing therefrom is provided, which differs from the other methods in that first embedding of the light-conducting mat in the casting mold and subsequent covering with a curable casting material is dispensed with.

Instead, in a first method step, a dimensionally stable negative mold having a profile that is complementary to the profile of the light-conducting mat, is anchored at the bottom of the casting mold.

In a second method step, the casting mold is filled with a curable casting material until the negative mold is embedded in the curable casting material.

In a third method step, filling of the casting mold with the curable casting material is continued until an overfill of the casting material over the embedded negative mold is achieved, wherein, in a fourth method step, a pressing plate is pressed on the overfill and the overfill is at least partially displaced and the casting material thereby compacted.

In a fifth method step, the cured casting material is removed from the casting mold, wherein, in a sixth method step, the negative mold sitting in the cured casting material is removed, and further, in a seventh method step, a light-conducting mat is inserted in the cavities created in the cured casting material by removing the negative mold.

This method, unlike the other methods, is characterized in that the light-conducting mat is only inserted after the slab-like material has been completely made and cured.

To achieve this, a negative mold—preferably of metal—is provided, which is enclosed in the curable casting material as a placeholder and, after curing of the material, removed from the cured slab material, so that the cavities in the cured slab material, that have now become free, are provided for inserting the light-conducting mat.

The negative mold is therefore provided as a placeholder, and in another embodiment of the invention, it may be provided that a so-called expendable mold is used for casting.

Such an expendable mold is characterized in that it remains in the cured casting material and is removed after curing by means of certain physical measures.

Such an expendable mold can be formed of a wax pattern, for example, and is enclosed in the casting material. To remove such a wax pattern from the casting material, the casting material is heated for a short time so that the wax becomes liquid and drips out of the cavities, which are then free for inserting the light-conducting mat.

In this method, it is preferred to remove the transverse rods of the light-conducting mat to ensure easy pressing or inserting of the light-conducting mat into the now free cavities in the cured slab material.

In a further embodiment of the present method, it can be additionally provided that the negative mold, preferably of metal, which is the placeholder for the light-conducting mat to be inserted later, is fixed on an additional, bottom-side retaining profile of the casting mold.

Herein, the negative mold is only fitted on a bottom-side retaining profile and is thus positionally secured in a particular manner.

Finally, in accordance with the subject matter of independent claim 17, it is provided that the light-conducting mat is pressed into the casting mold filled with a removable casting material by means of a simple pressing process.

For this purpose, it is provided that, in a first method step, the mold cavity of a casting mold is filled with a curable casting material, that, in a second method step, the light-conducting mat to be embedded in the casting material is fixed on the underside of a molding punch to be pressed into the casting mold, and that, in a third method step, the molding punch moves into the mold cavity together with the light-conducting mat fixed at its underside and thus presses the light-conducting mat into the casting material.

Here again, a single-layer concrete method is preferred enabling the grid-like injection-molded mat to be pressed into the fresh concrete or any other curable casting material from above.

This presupposes, however, that the light-conducting rods of the light-conducting mat are rounded at their surfaces to be able to better displace the concrete sliding by.

Furthermore, it is preferred for the bottom of the casting mold not to have a hard, but a soft, elastic surface. This enables the rounded point of the light-conducting mat to be better pressed into the mold bottom. However, the water must be extracted so that, after the pressing process, the light-conducting mat is not lifted back up again.

The gating channels of the light-conducting mat formed as an injection molded part, can either remain in the mold, or they may also be removed beforehand.

It should also be noted that in the above-mentioned methods according to the independent method claims, the anchoring of a retaining profile at the bottom of the casting mold has the advantage that cement slurries cannot penetrate the fine-profile channels of the light-conducting mat because they are surrounded and sealed by the bottom-side retaining profile in an interlocking manner.

The use of an elastically deformable bottom as the bottom of the casting mold has the further advantage that the edges of the light-conducting mat contacting this bottom are pressed against the same while the bottom has a certain amount of give and thus any grains of the cement material remaining on the edges are removed from the edges of the light-conducting elements and do not cover the light emitting sides of the light-conducting elements.

The concrete is thus laterally displaced away from the light-conducting elements; in particular when they have circumferential, rounded edges.

It is only necessary for the elastic bottom to give by an amount of about 0.5 mm. Incidentally, this has the advantage that, after the now finished slab-like light-conducting body has been removed from the mold, the light-emitting surfaces of the light-conducting elements protrude from the cured slab material of the slab by an amount of about 0.5 mm and can thus be further processed. Such processing can be by means of grinding, polishing or any other measures.

The inventive subject matter of the present invention can be derived not only from the subject matter of the individual patent claims but also from the combination of the individual patent claims among each other.

Any information and features disclosed in the documents, including the abstract, in particular any spatial configuration as shown in the drawings, are claimed as essential to the present invention insofar as, alone or in combination, they are novel over and above the state of the art.

The invention will be explained in more detail with reference to drawings showing only one possibility of implementation. Herein, further features and advantages of the invention that are essential to the invention can be derived from the drawings and their descriptions.

Figure 15:
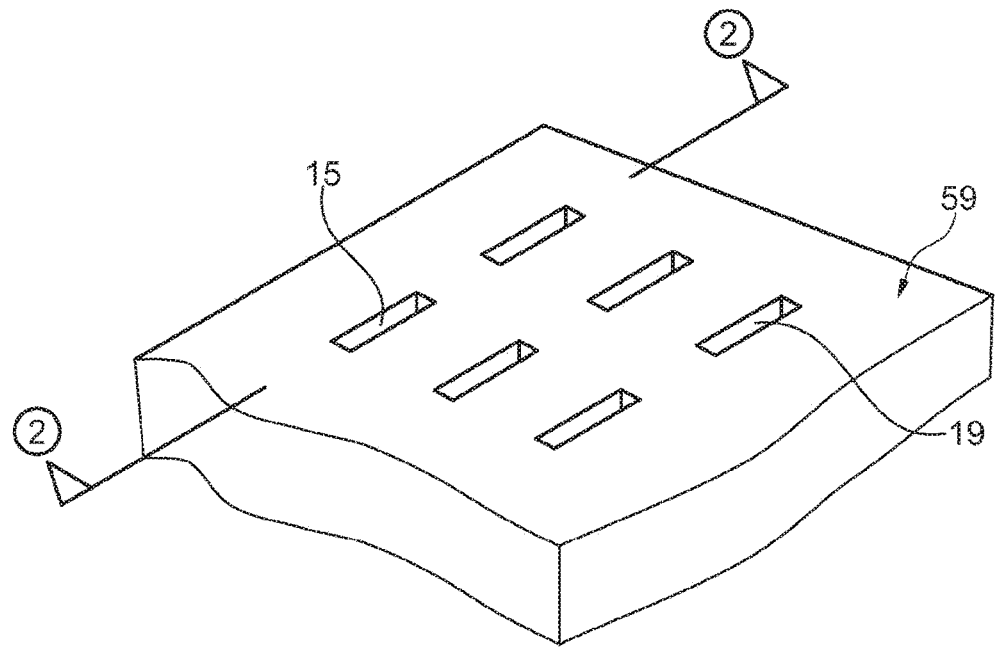
FIG. 15 is a perspective view of a pressing plate of the embodiment of the method of FIG. 16.
Figure 16:
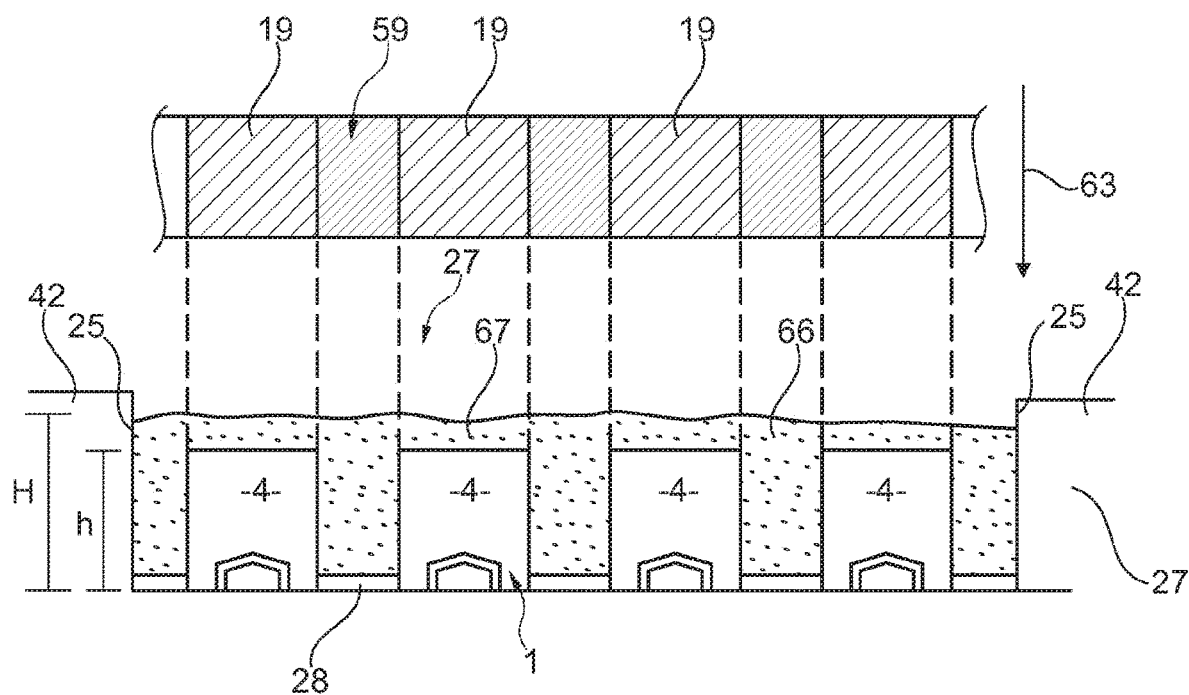
Figure 17:
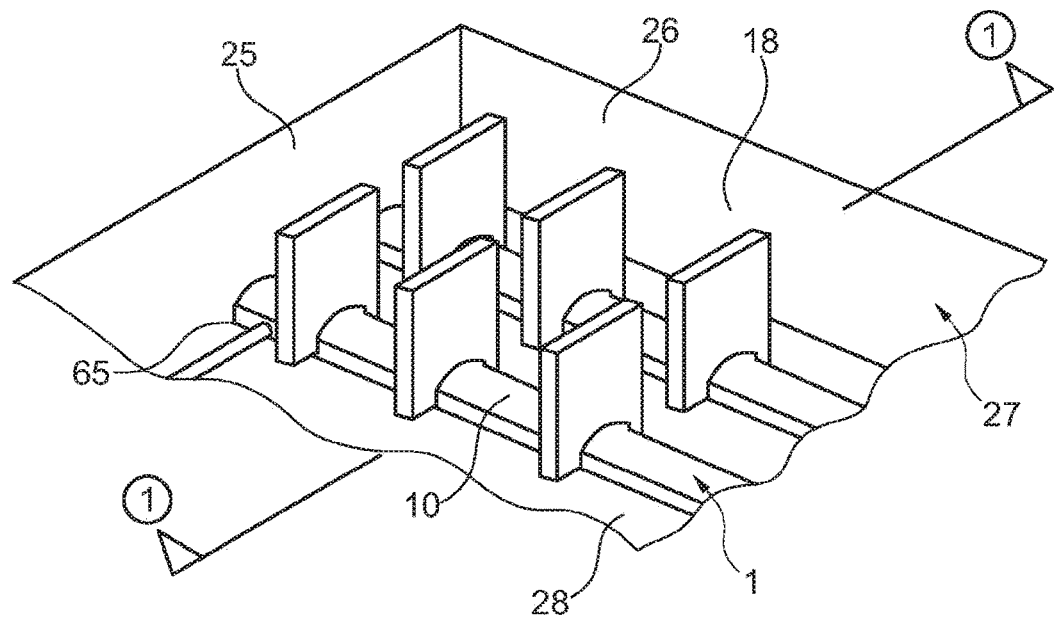
Figure 18:
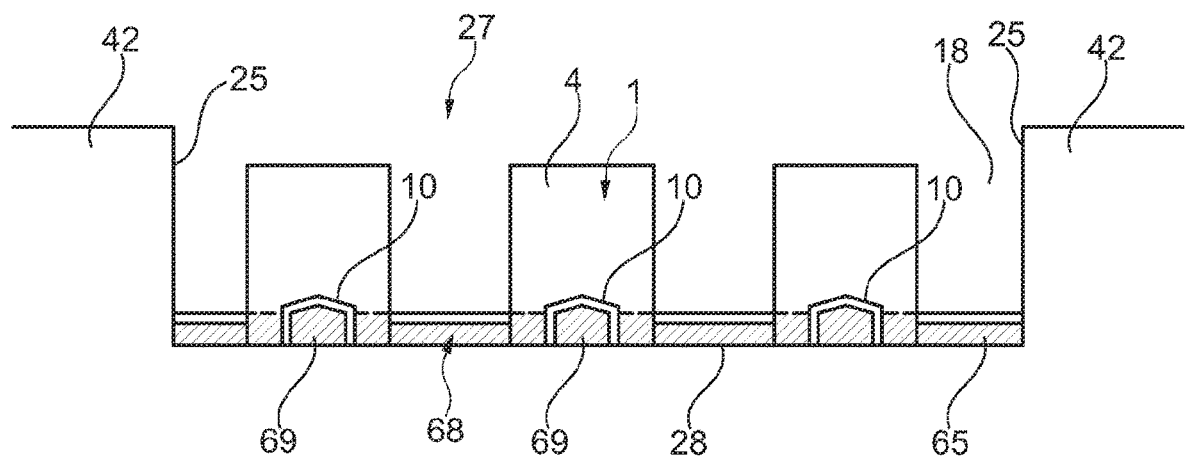
Figure 19:
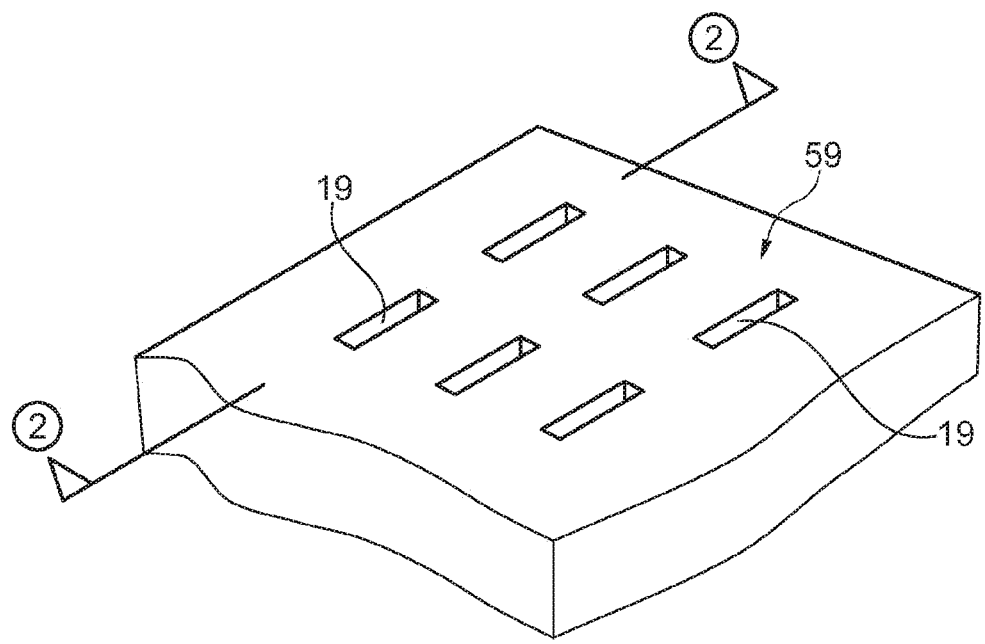
Figure 20:
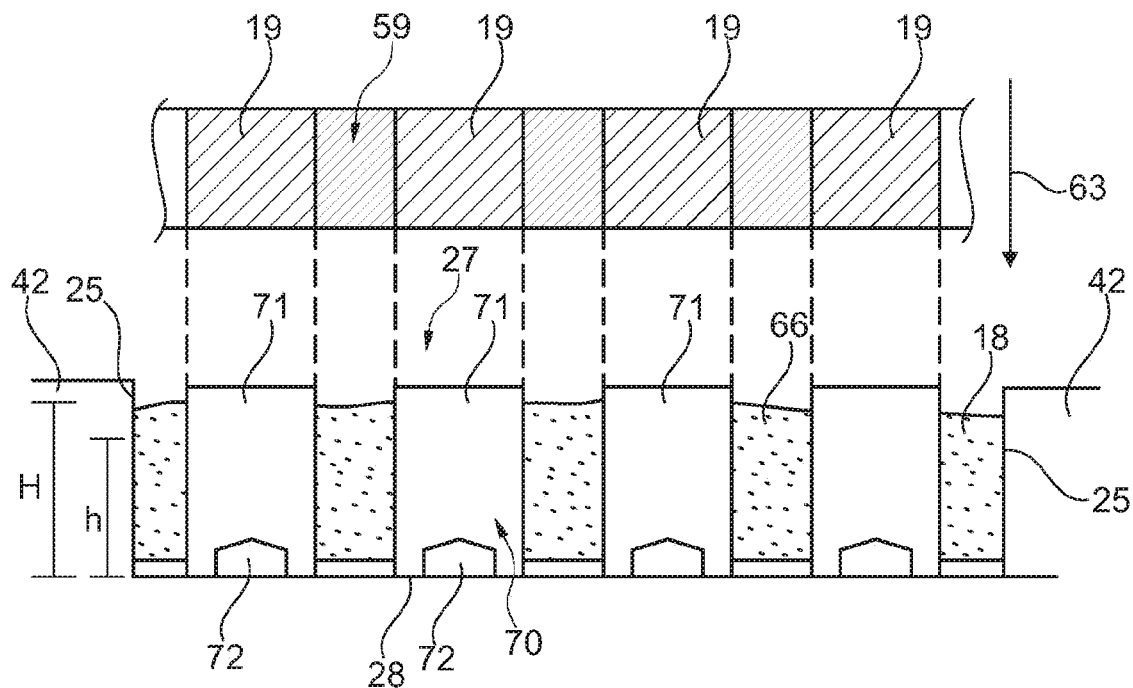
Figure 21:
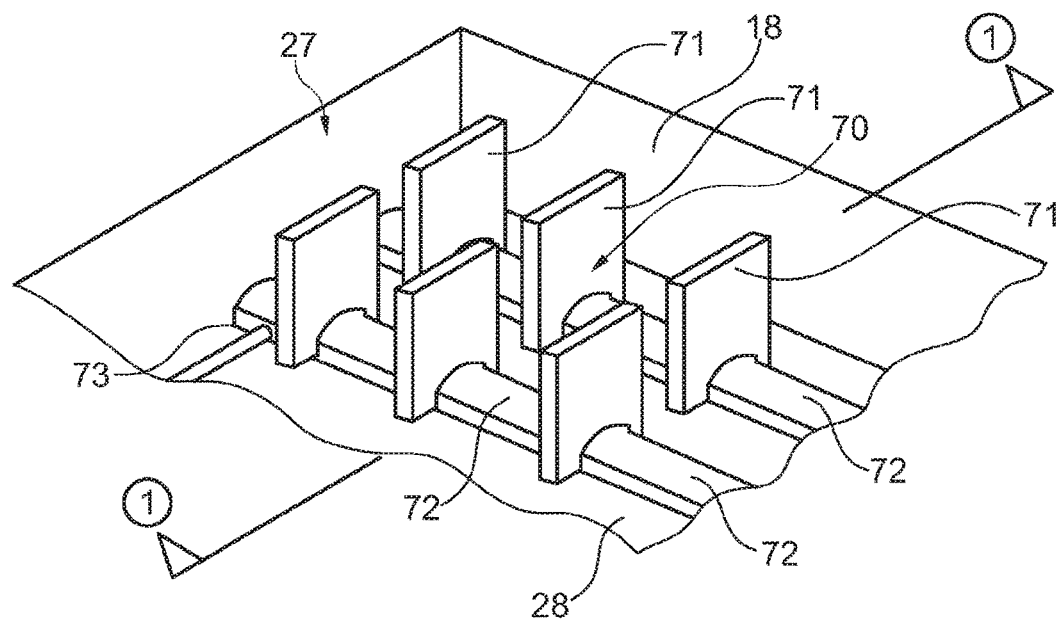
Figure 22:
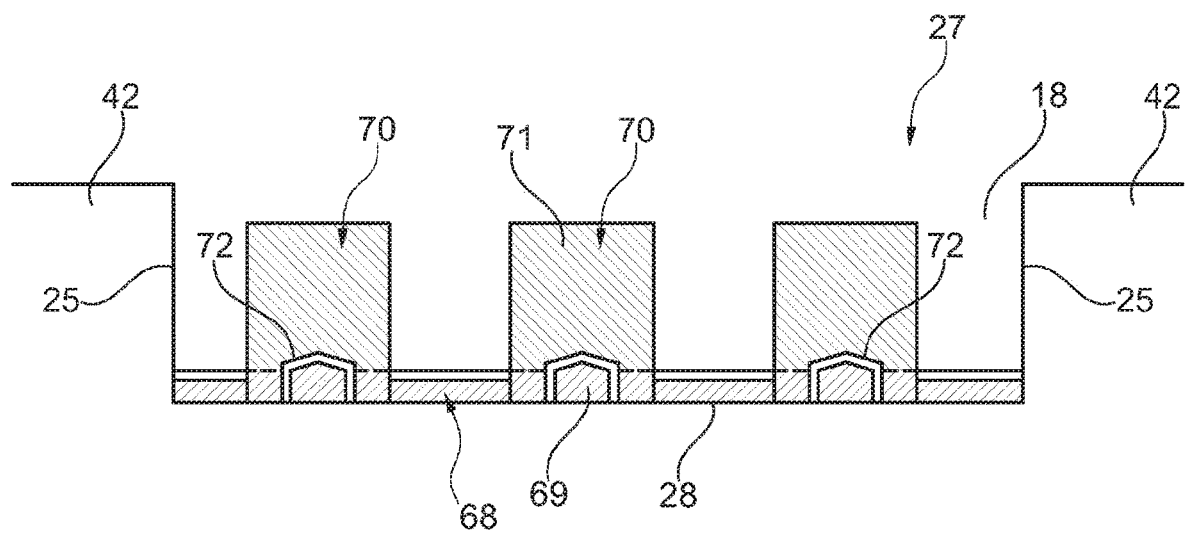
Figure 23:
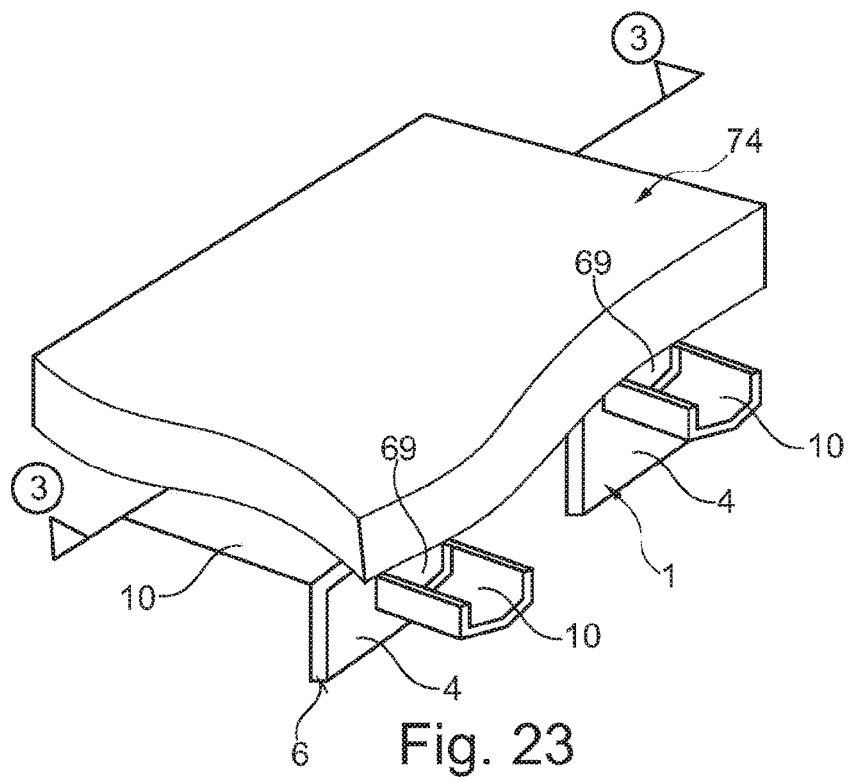
Figure 24:
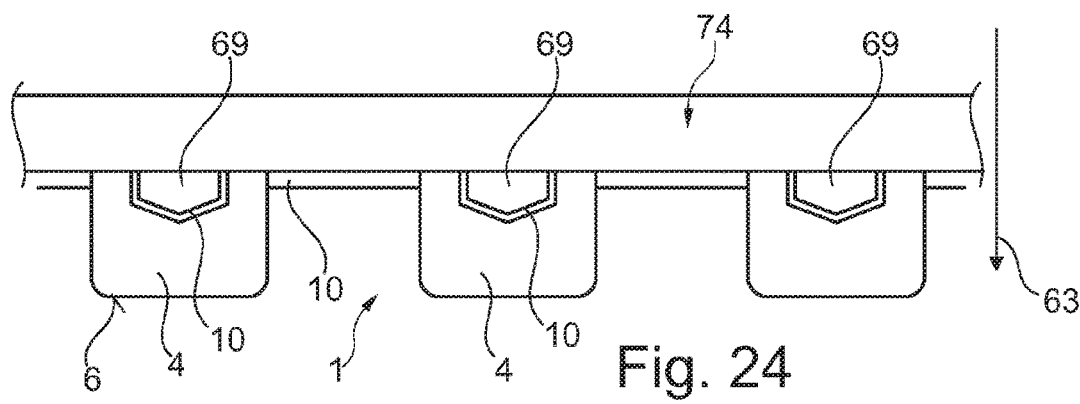

FIG. 16 schematically shows a sectional view of a casting mold with a section of the pressing plate of FIG. 15;

FIG. 17 shows a perspective view of the anchoring of the light-conducting mat at the bottom of the casting mold;

FIG. 18 shows an embodiment, modified with respect to FIG. 17, wherein an additional retaining profile is arranged at the bottom of the casting mold;

FIG. 19 shows the perspective view of a pressing plate for use in the method of FIG. 20;

FIG. 20 schematically shows a sectional view of the further method, showing a metal negative mold and its anchoring in the mold cavity of the casting mold;

FIG. 21 shows the perspective view of the negative mold consisting of metal and its anchoring at the bottom of the casting mold;

FIG. 22 shows an embodiment modified with respect to FIG. 21 in which the negative mold is additionally anchored on a bottom-side retaining profile in the casting mold;

FIG. 23 shows a perspective view of a molding punch with a light-conducting mat attached at its underside;

FIG. 24 shows the arrangement according to FIG. 23 in a section view; and

Figure 25:
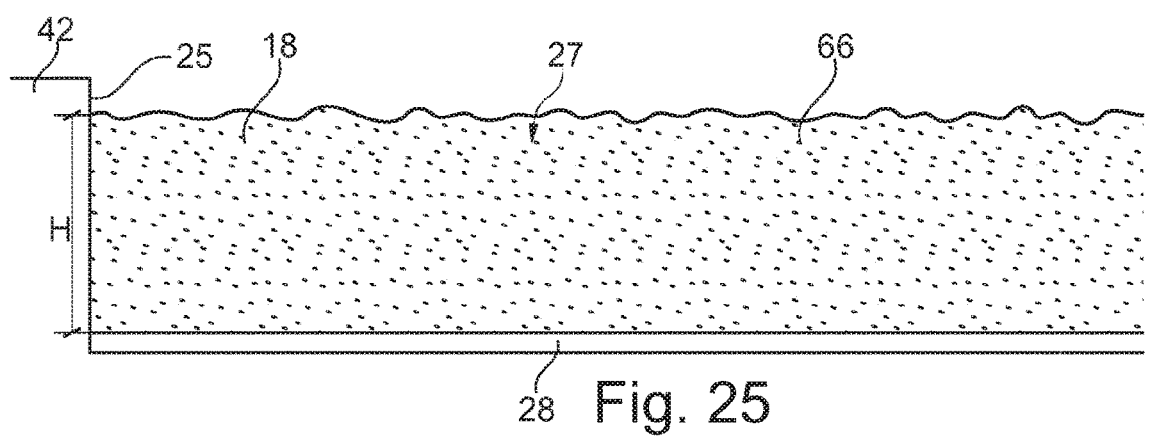

FIG. 25 shows a section of the casting mold, showing that the light-conducting mat shown in FIG. 24 is pressed into the casting material at the underside of the molding punch.

Figure 1:
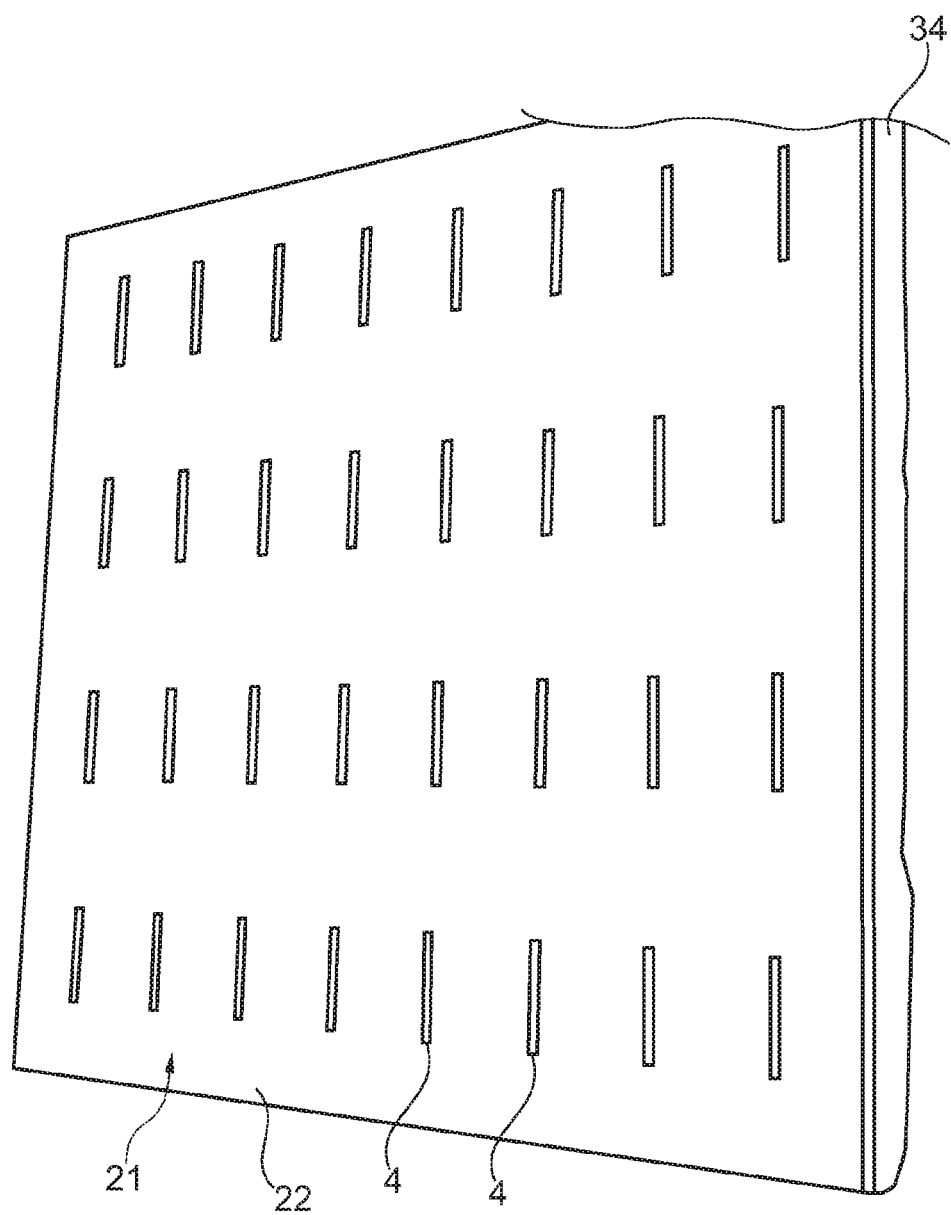
FIG. 1 shows a top view of a light-conducting body of a concrete material.

FIG. 1 shows the configuration of a light-conducting body as an exemplary embodiment, as a concrete slab in road traffic. It could also be used, however, as a facade plate for interior and exterior spaces.

When it is used as a facade plate, one or more heat insulating layers can also be arranged on the light-producing back side.

The concrete-stone-like, slab-like light-conducting body 21 shown there, is installed embedded in a road surface, and the light emitting end faces of light-conducting elements 4 embedded therein are visible in the top surface 22 of the light-conducting body 21. They emit light visible from above, which is produced on the back side of the light-conducting body 21.

Figure 2:
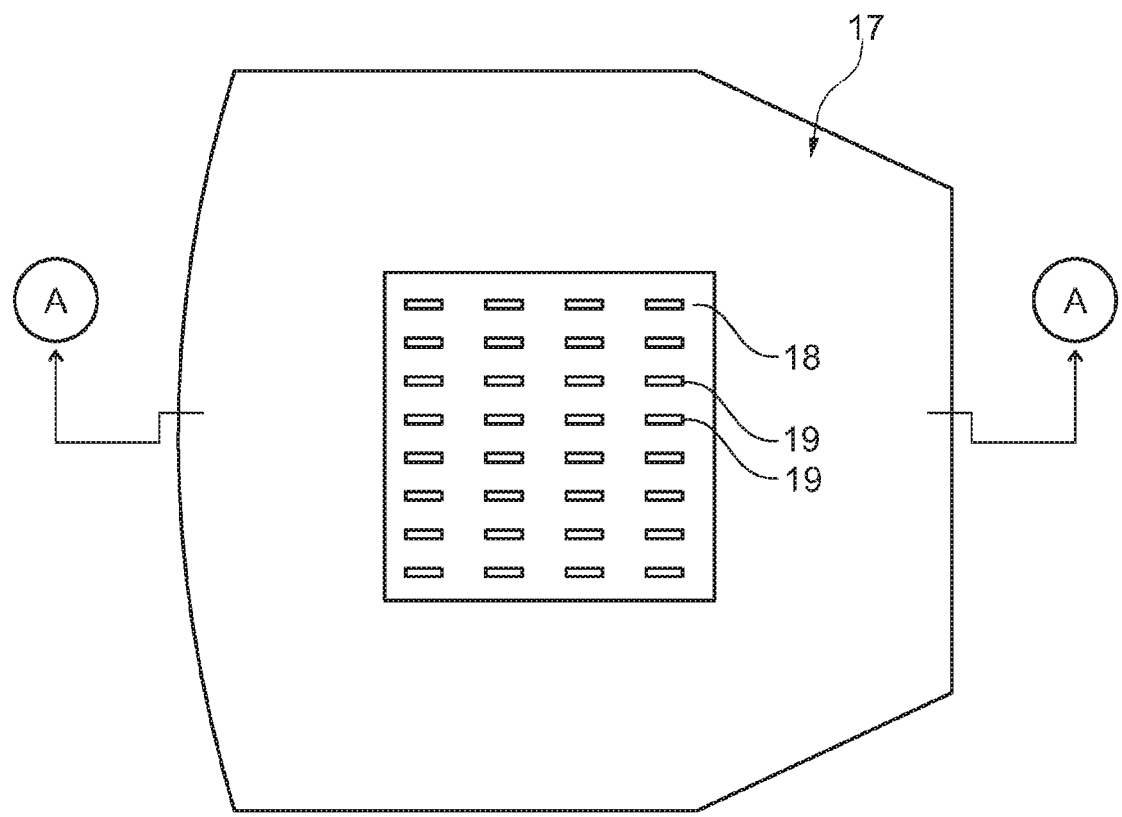
FIG. 2 shows a top view of a casting mold platen for the production of a concrete paving stone of FIG. 1.

FIG. 2 shows the top view of the mold cavity 18 of a casting mold platen 17 which is part of a multiple mold of a press 23 preferably formed as a round table press.

A plurality of slots 19 are arranged in the bottom of the mold cavity 18 in the manner of a grid, wherein the type, size and distribution of the slots corresponds to the light-conducting elements 4 to be used therewith later.

Figure 3:
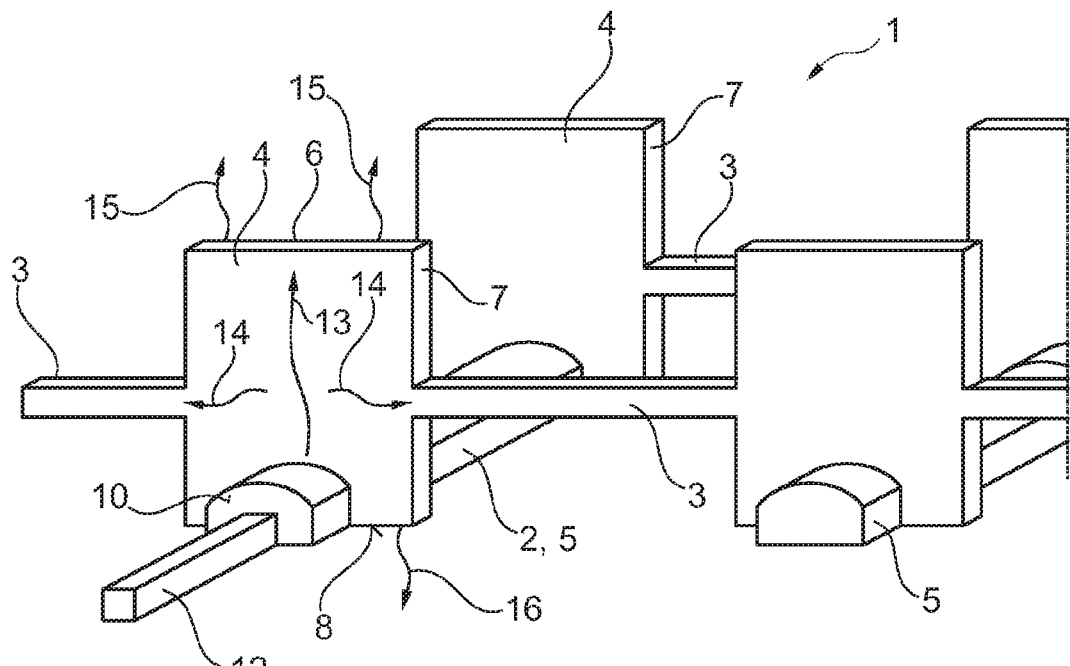
FIG. 3 shows a perspective partial view of a light-conducting mat.
Figure 4:
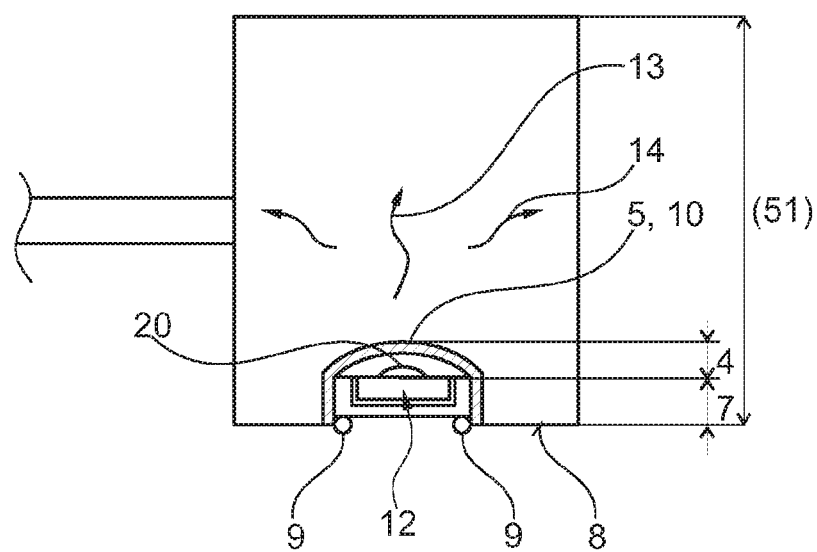
FIG. 4 shows a sectional view of the light-conducting mat of FIG. 4 at the position of a light-conducting element.
Figure 8:
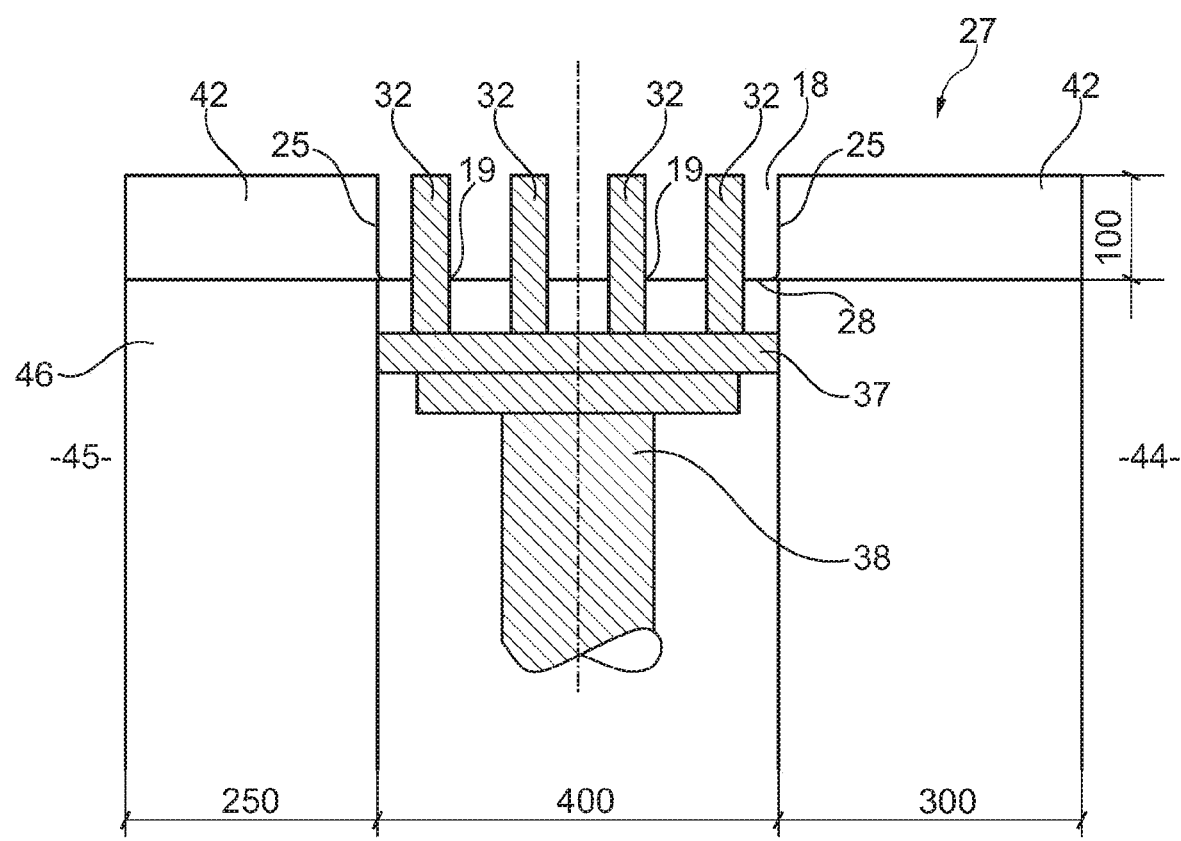
FIG. 8 shows a sectional view of the plate segment of a hermetic press in the initial state.
Figure 9:
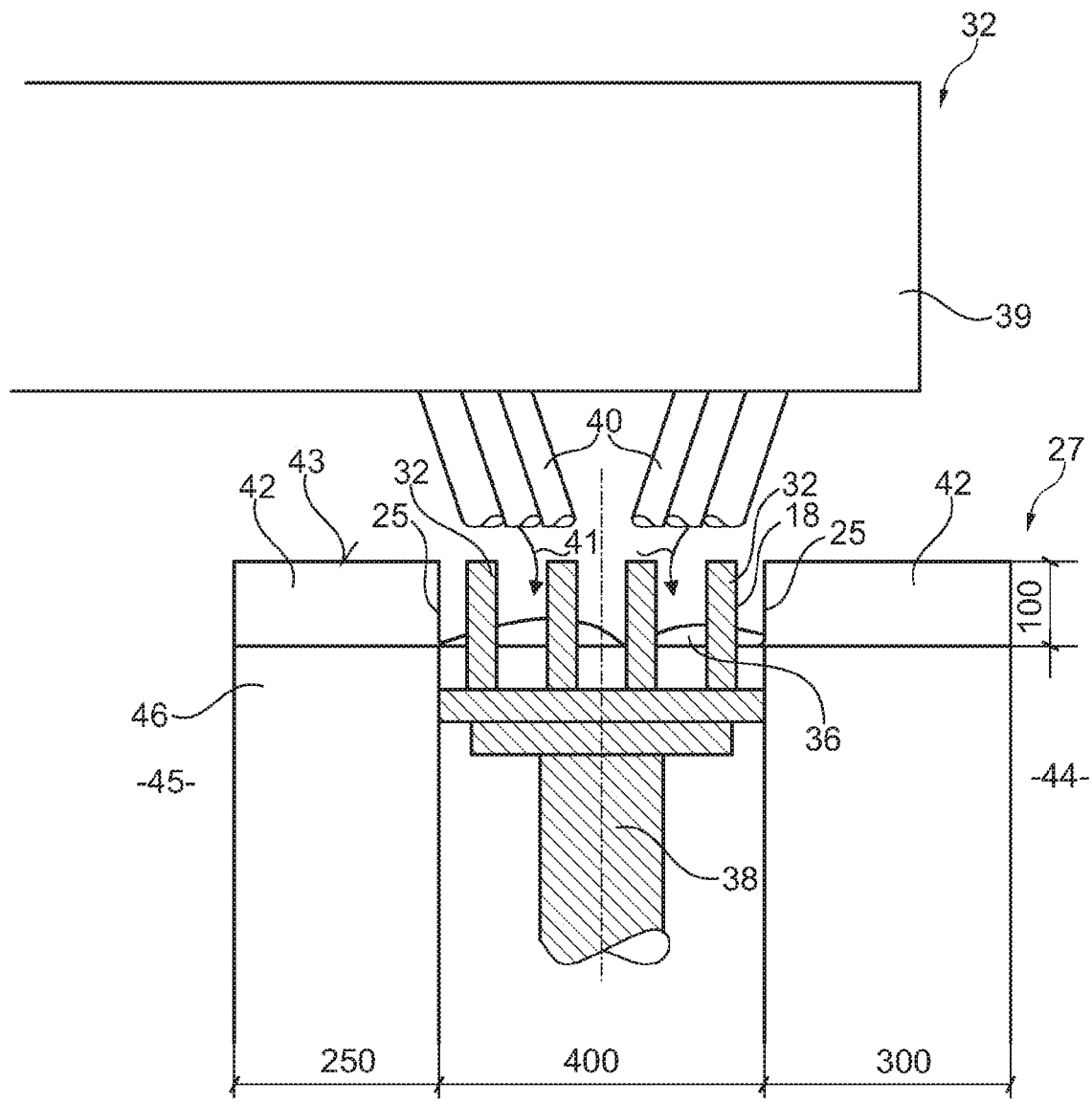
FIG. 9 shows the same sectional view as FIG. 12 during pouring of facing concrete into the mold cavity.

FIGS. 3 and 4 show a light-conducting mat as described in our own POT application WO 2016/150454 A1 in the associated FIGS. 8 and 9, the description thereof being incorporated herewith by reference. Generally, it can be said that the light-conducting mat 1 is of a transparent, light-conducting plastic material, wherein the light emitting light-conducting elements 4 comprise side surfaces 7 at which transverse webs 3 are attached which connect the light-conducting elements 4 extending in parallel and arranged at a spacing with respect to each other.

Figure 12:
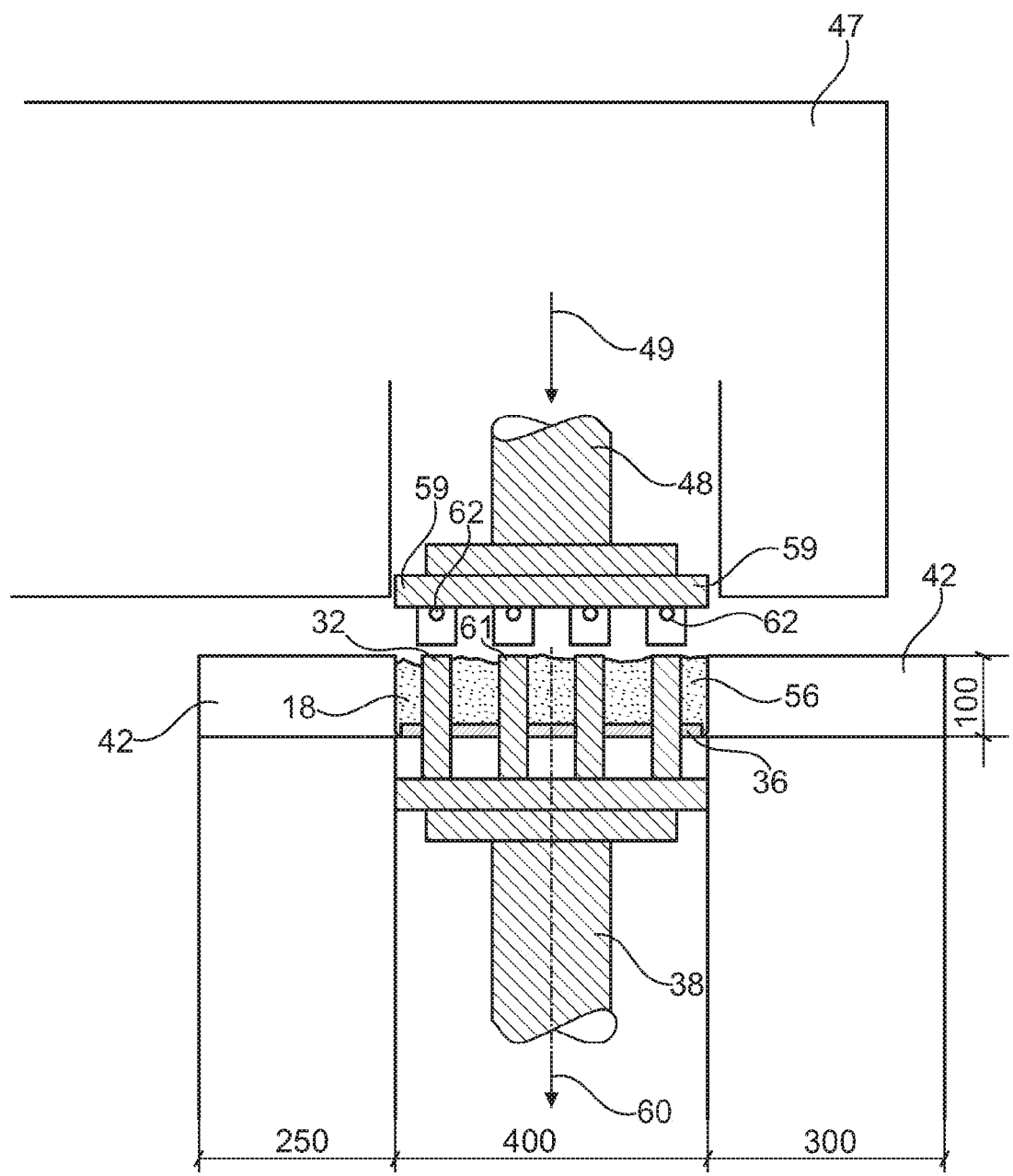
FIG. 12 shows how the breakage-prone light-conducting mat is pressed by a top plunger on the molding punches preceding them as templates in the core concrete.

It is also possible to remove the transverse webs 3 to avoid interference with the subsequent pressing method (see FIG. 12).

Longitudinal webs 2 are provided in the transverse direction to the transverse webs 3, which are preferably formed as profile channels 10 and in which light rods 12 are snap fitted.

Each light channel 5 is thus filled by a light rod 12 which is formed as a rail section and is snap engaged behind two opposed snap-in tabs 9 on the bottom side 8 of the light-conducting element 4.

The numbers shown on the right in FIG. 4 are indications in millimeters referring to the height of the elements individually shown there.

Since the light channel 5 also consists of a transparent, light-conducting plastic material, it emits the light in the arrow direction 13 into the light-conducting elements 4, and the light is ultimately emitted in the arrow direction 15 from the end faces 6 of the light-conducting elements 4.

These end faces 6 are the light-emitting surfaces in the light-conducting body 21 in FIG. 1.

It goes without saying that the invention is not limited to plate-like light-conducting elements 4. They can have any profile shape, i.e. they can be corrugated, round-profiled, circular, cylindrical or any other shape. They can also be formed as hollow sections or as a solid material.

The only thing that is crucial to the present invention is that the molding punches 32 to be described later in the bottom portion 33 of a press are adapted to the dimension and profiling of the light-conducting elements 4.

For manufacture, a hermetic press is preferred which works as a clocked round table press. A number of mold cavities 18 are arranged in the area of a plurality of juxtaposed casting mold platens 17 (see FIG. 2). One light-conducting body 21 is produced in each mold cavity.

The press 26 essentially consists of a round table circulating in a clocked manner, at the periphery of which a number of devices are arranged, such as a feeding unit, the control panel and further functional elements, such as a vibrator, brush tools and the like.

Figure 7:
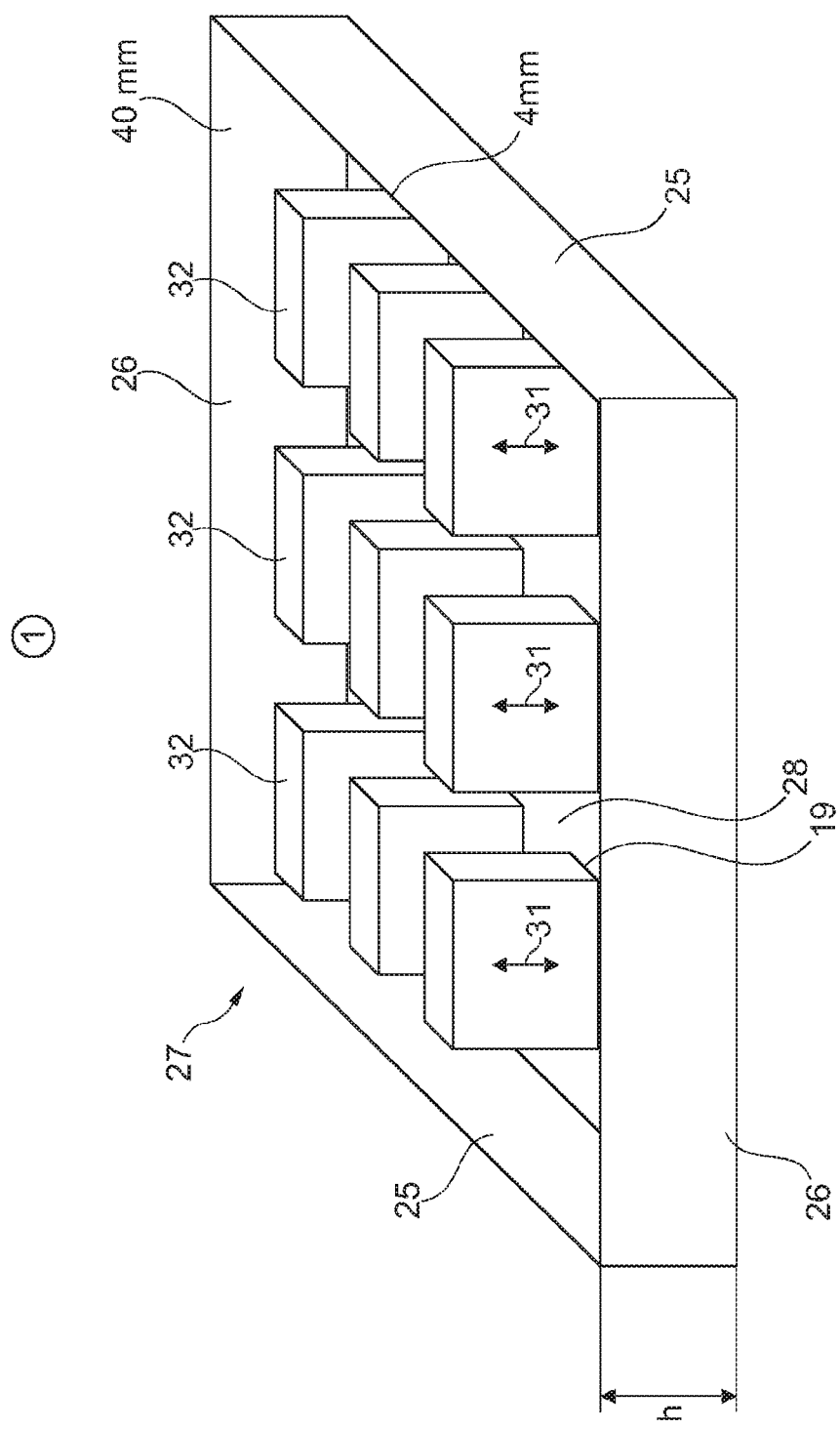
FIG. 7 shows a refined view with respect to FIG. 10 showing a perspective view of the casting mold platen with molding punches arranged therein in a raised state.

The mold cavity 18 arranged in the casting mold platen 17 is of an approximate box shape, as shown in FIG. 7, and a plurality of slots 19 perforate the bottom 28 of the casting mold 27, through which the molding punches 32 of a lower mold, to be described later, pass.

As already explained, the type, profiling and the mutual spacing of the slots 19 arranged in a grid correspond to the type, the profiling and the grid-like distribution of the light-conducting elements 4 in the light-conducting mat 1.

Figure 5:
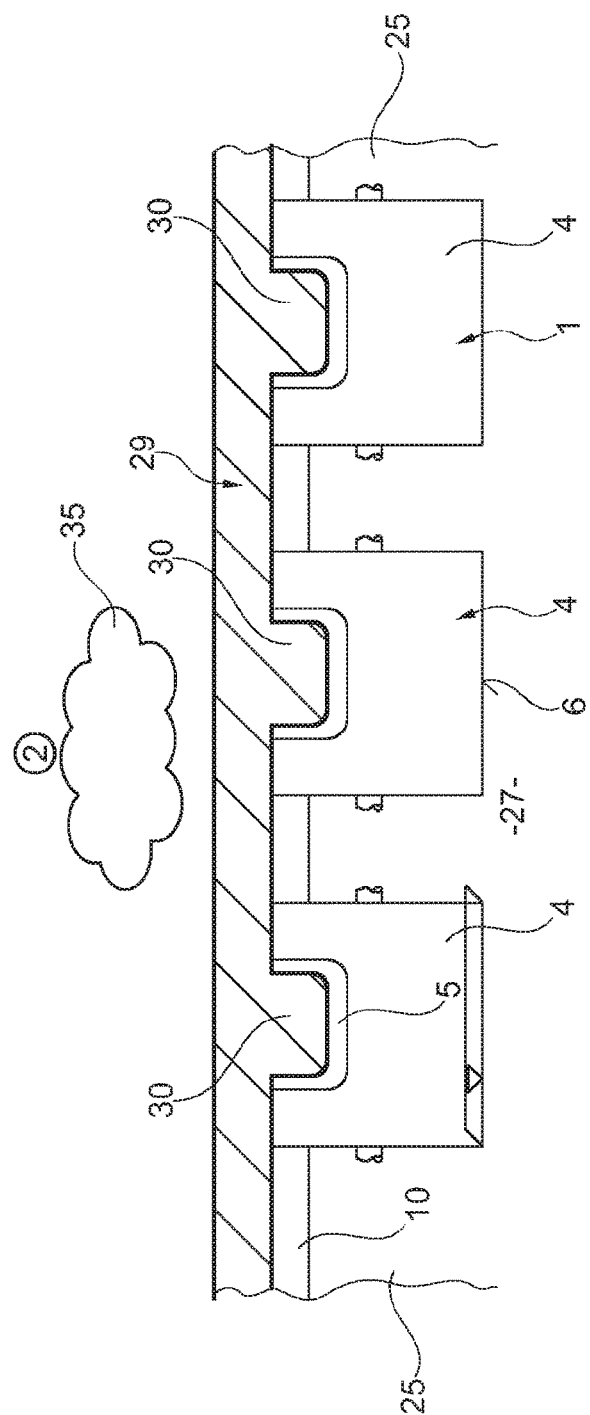
FIG. 5 shows a partial sectional view of the top portion of the hermetic press while showing the anchoring of the steel counter mold arranged in the top portion in the light-conducting elements.

FIG. 5 shows a portion of a method sequence to be described later in more detail with reference to FIGS. 8 to 14.

Figure 6:
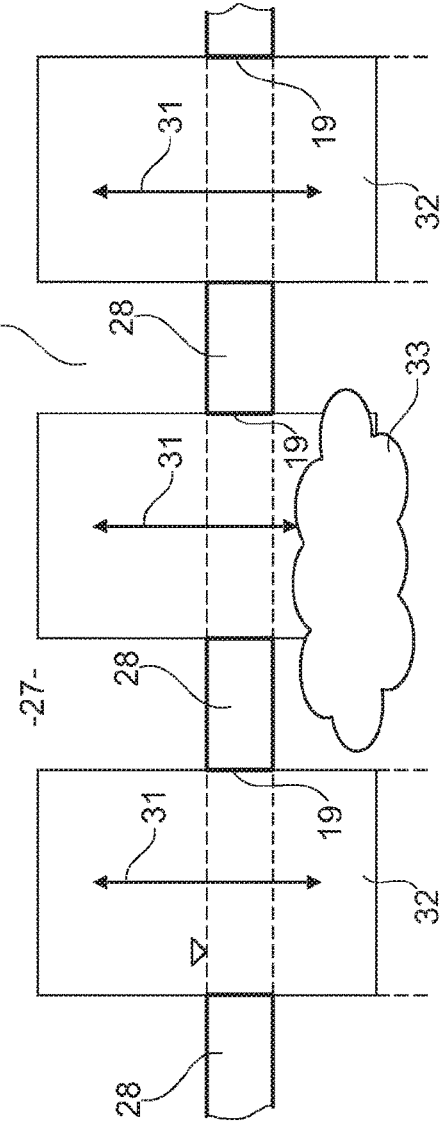
FIG. 6 shows a schematic view of the molding punches moving in slots of the bottom of the casting mold platen 17, formed as a metal plate 42, in the vertical direction.

Namely, it is important that the method sequence described in FIGS. 5 and 6 uses a steel pressing plate 29 in the upper mold 47 comprising a plurality of short retaining profiles 30 engaging in the associated light channels 5 of the light-conducting mat in a manner that is as backlash-free as possible to thus enable guiding of the breakage-prone light-conducting mat 1 at the upper steel pressing plate 29.

FIG. 7, in combination with FIG. 8, shows the type and arrangement of molding punches 32 arranged in the lower mold 46, which are arranged to be movable in the arrow directions 31 in the slots 19 in the bottom 28 of the casting mold 27.

This can be derived from the perspective view of FIG. 7. The molding punches 32, extending through the bottom 28 in a grid-like manner, are thus shown in their raised positions, A partial section of such a press is shown in FIG. 8, where it can be seen that the molding punches 32 arranged in a grid-like manner, which extend through the slots 19 in the bottom 28 of the casting mold 27 are fixed on a common pressure plate 37 which is driven on a plunger 38 in the lower mold 46 in a raisable and lowerable manner.

Since the press has an outer and an inner side, the inner side is shown at 44 and the outer side is shown at 45.

The top edge of the casting mold 27 is formed by a metal plate 42.

FIG. 9 now shows that in the area of a filling device 39, the relatively low-viscosity facing concrete 36 is poured via tubes 40 as a first casting material in the arrow direction 41 into the mold cavity 18. Herein, the molding punches 32 are maintained in their raised position in the mold cavity 18 so that the relatively low-viscosity facing concrete 36 flows around the molding punches 32.

Figure 10:
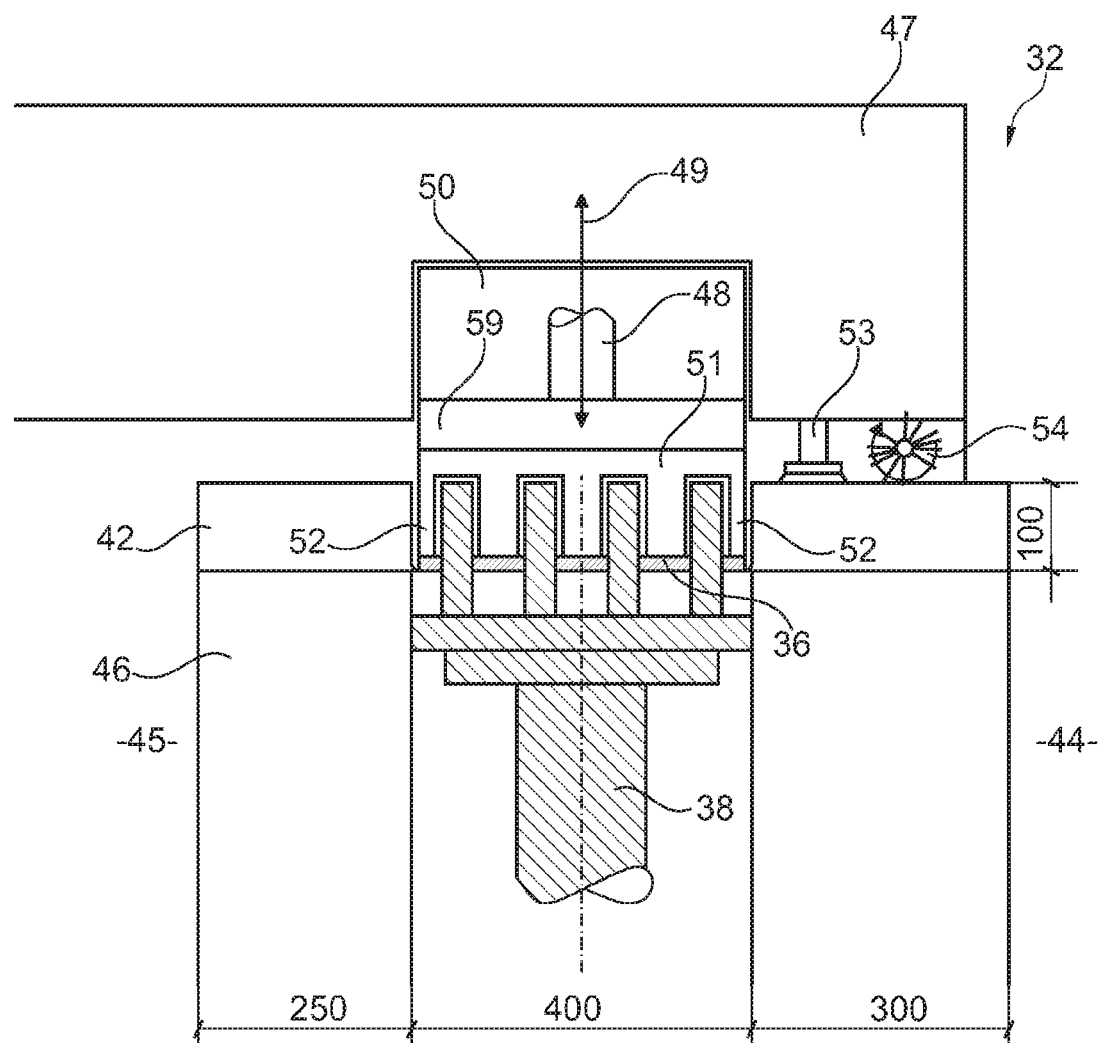
FIG. 10 shows the method progressing with respect to FIG. 13 showing that the facing concrete is also compacted by the press and a vibrating plate in the mold cavity.

In accordance with FIG. 10, this is followed by uniform smoothing of the facing concrete 36 in the casting mold 27 by providing a pressing plate 59 with vibrating punches 52 protruding in a comb-like manner in an upper mold 47, which are moved between the still raised molding punches 32 downwards into the mold cavity 18 in the arrow direction 49 in a manner that precisely fills the gaps, and are placed upon and compact the facing concrete as the first casting material 36.

During this, the plunger 38 in the lower mold 46 remains in the locked position.

After the compacting is complete, the end faces of the molding punches 32 are cleaned with a brushing tool 54, and an abrasive tool 53 is also used.

The vibrating punches 52 provided with prong-like protrusions are part of a vibrating plate 51.

After the smoothing of the facing concrete as a first casting material 36 is complete, this is followed by pouring the very viscous (earth-moist) core concrete as the second casting material 56.

To do this, the core concrete, as the second casting material 56, is fed in a feeding unit 58 via a conveyor 55 and filled into the mold cavity 18 in the arrow direction 57. Again, brushing tools 54 and abrasive tools 53 are used to achieve advantageous surface properties.

This is followed, in FIG. 12, by the actual process of pressing-in the light-conducting mat 1, which has meanwhile been attached at the underside of a pressing plate 59 in a positionally secure manner.

Positional securing is carried out using centering tabs 62 arranged at the underside of each pressing plate 59 which engage in the associated recesses which form the light channels 5 in the light-conducting mat 1 in an interlocking manner. This ensures that the light-conducting mat 1 is held at the underside of the pressing plate 59 in a positionally secure manner. Additional retaining means, such as the application of a vacuum, can also be used.

Then, by moving the plunger 48 in the arrow direction 49, each light emitting end face 6 of the light-conducting elements 4 is placed on the end faces 61 of the molding punches 32 in the lower mold and held by the application of a weak pressing force in the arrow direction 49.

The two plungers 48, 38 now perform a common (synchronous) downwards movement in the arrow directions 49, 60 so that the molding punches 32 move through the core concrete 56 and at the same time form the preceding templates for the following light-conducting elements 4 having the same profile and number.

The light-conducting elements 4 are thus no longer obliged to perform their own displacement work in the core concrete 56 and are therefore protected against breakage.

Figure 13:
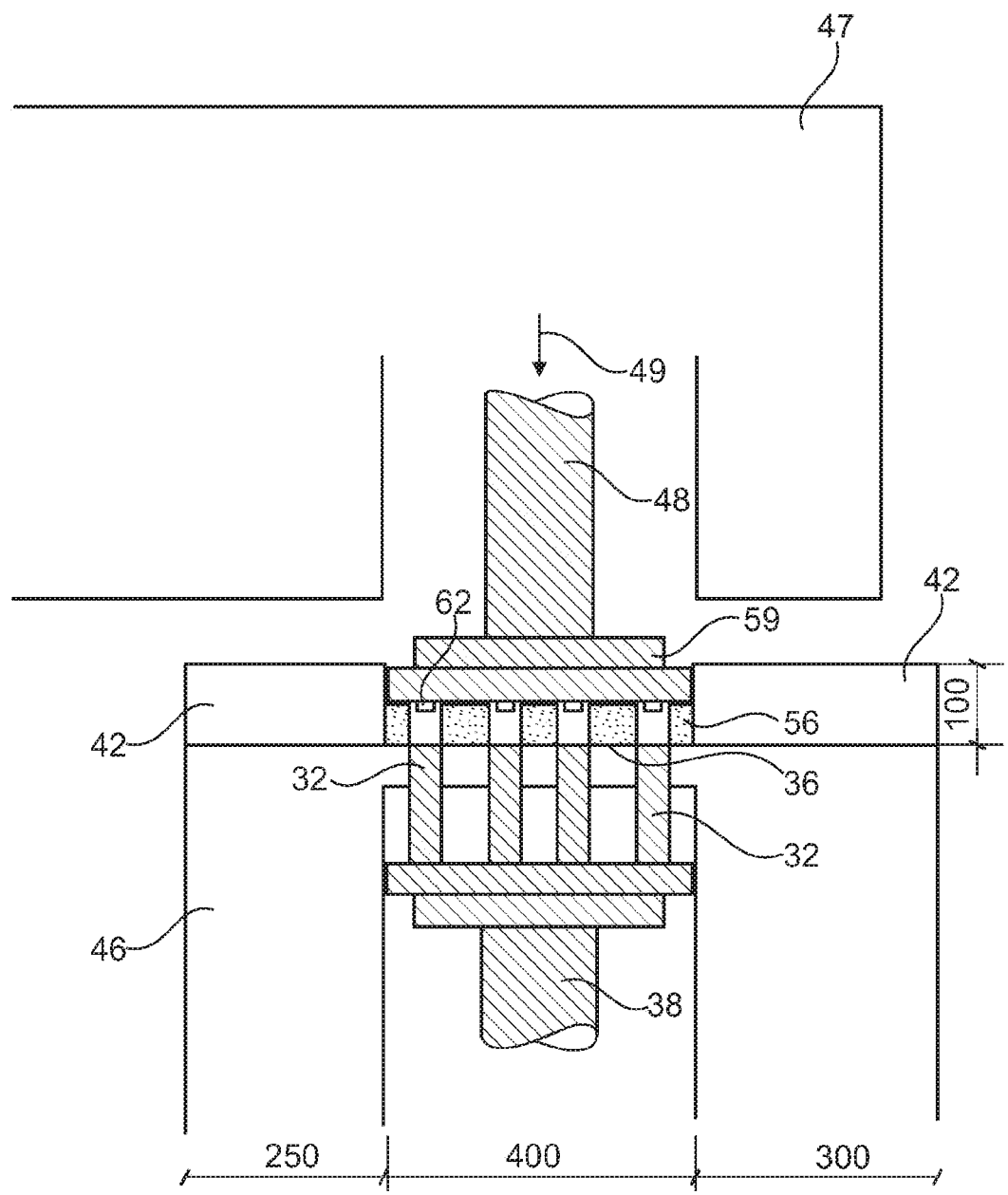
FIG. 13 shows the method progressing with respect to FIG. 16 showing the process of pressing the light-conducting mat into the mold cavity.

FIG. 13 shows the final state of the pressing process in which the light-conducting mat with its light-conducting elements 4 has arrived at the bottom of the mold cavity 18 and, at the same time, has also penetrated the facing concrete 36.

Then the pressing plate 59 is moved downwards in the arrow direction 49'—in an embodiment not shown in any more detail—a high pressure can then also be exerted on the core concrete by a suitable pressing tool (see FIG. 14) to thus compact the spaces between the light-conducting elements 4.

Figure 14:
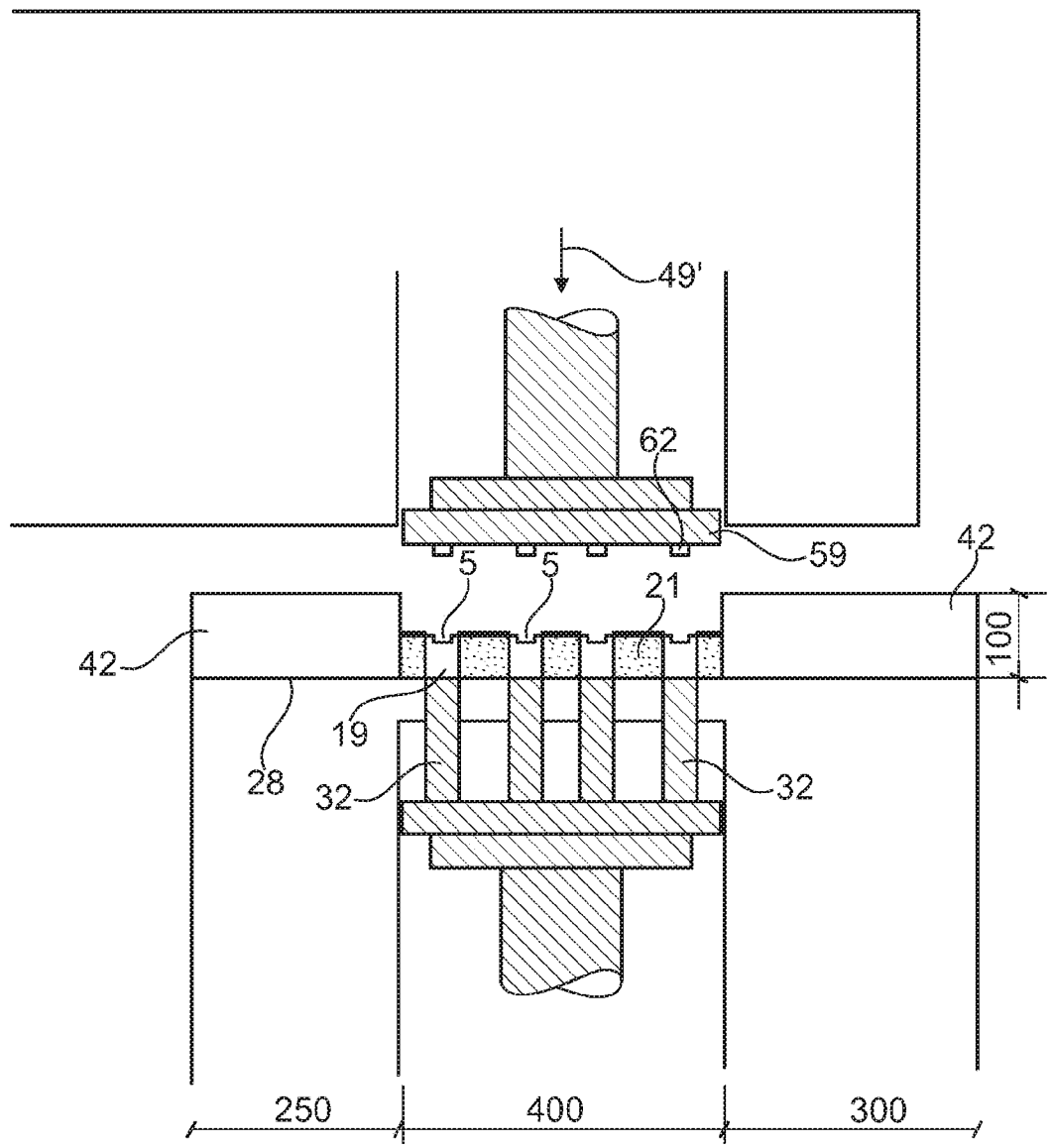
FIG. 14 shows the finished light-conducting body of cured concrete material.

Then, in accordance with FIG. 14, the finished light-conducting body 21 is removed from the mold and is stored for the subsequent curing process.

The vibrating process for vibrating the facing concrete described with reference to FIG. 10 ensures that the facing concrete is uniformly distributed over the entire bottom 28 of the mold cavity 18. It is thus ensured that, in the final product, the viewing side will always have the same thickness. Before this, however, the surface of the metal plate and the casting mold protruding from the mold is cleaned by means of a rotating brush and a sponge.

Figure 11:
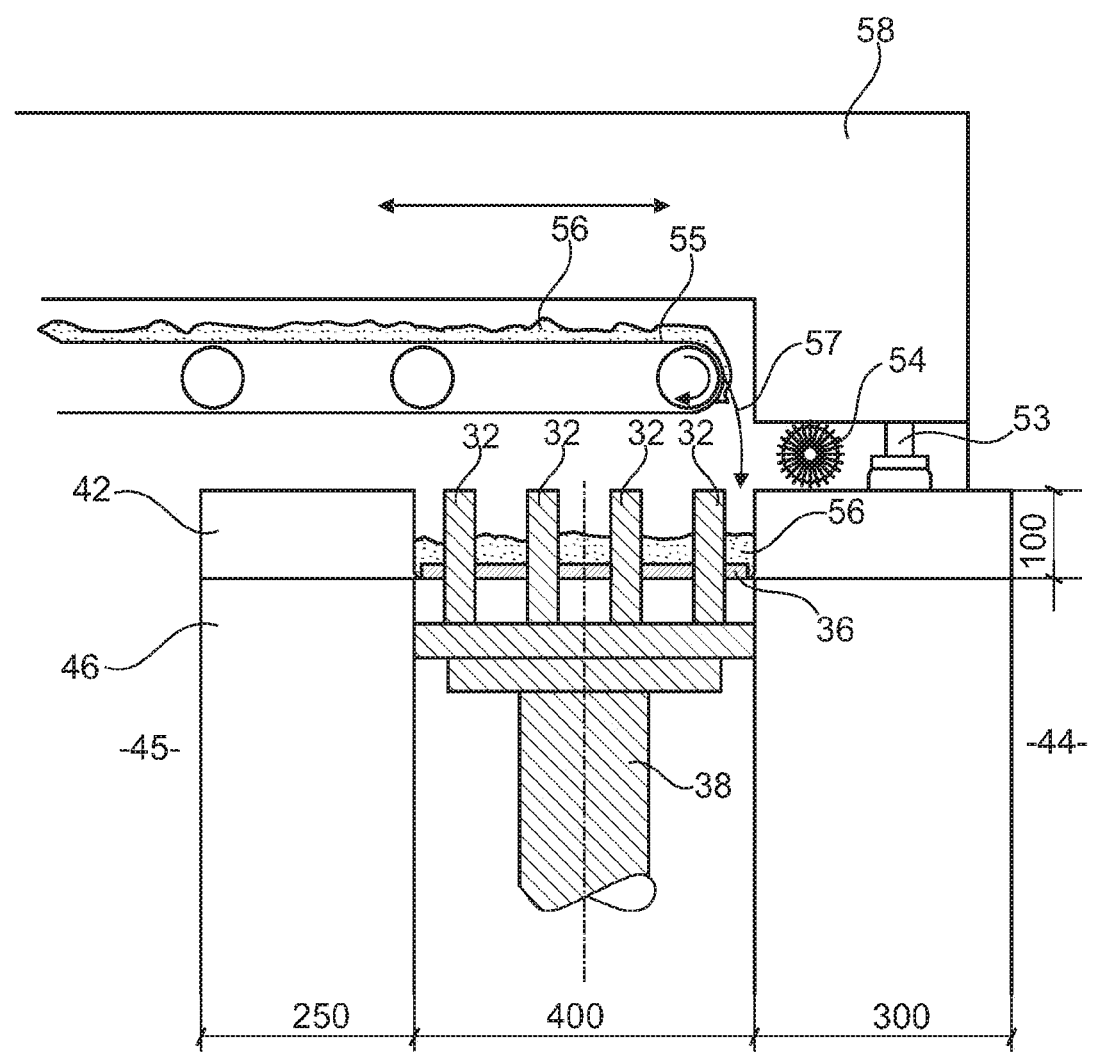
FIG. 11 shows the method step progressed with respect to FIG. 14 which shows that the core concrete is now being poured on top of the compacted facing concrete.

Precisely dosed amounts of a very dry concrete are then introduced also in the method step according to FIG. 11 via the conveyor 55 into the mold cavity 18. Then, the metal plate 42 and the molding punches 32 protruding from the mold are cleaned by means of a rotating brush 54 and a sponge.

It has been explained with reference to FIG. 12 that the light-conducting mat 1 is held at the underside of the pressing plate 59 in a positionally secure manner. In a preferred embodiment, this step is performed using an arm robot, wherein the light-conducting mat 1 consisting of an injection-molded material is attached by slightly lowering the plunger 48 and the simultaneous application of a vacuum acting on the light-conducting mat 1.

In any case, it is important that the molding punch has the same recesses as the light-conducting mat 1 at the underside. The underside of the light-conducting mat is that side in which the LED elements 20 provide the lighting and on which the cables are routed.

This ensures that the light-conducting mat does not break even when a very high pressure is applied.

A special working station is not necessary for fixing the light-conducting mat at the underside of the pressing plate 59. While the light-conducting mat 1 is being pressed into the core concrete in accordance with FIGS. 12 and 13, only a small pressure is applied by the plunger 48 in the arrow direction 49 which now ensures that the lower, light-emitting end faces 6 of the light-conducting elements 4 are placed on the end faces 61 of the molding punches 32 in a full and flush manner. This is followed by the previously described synchronous movement of the two plungers 38, 48 in the arrow directions 49, 60.

When the molding punches 32 are moved out of the bottom of the mold cavity there is now the advantage that the moisture of the facing concrete penetrates the core concrete without damaging the injection molded part and a curing process takes place between the facing concrete and the core concrete. The resulting strength of the concrete material produced in this manner is thus the same as that of a normal concrete slab not penetrated by light-conducting elements.

The last pressing process described above as an additional working step can thus be dispensed with since the molding punches moving out of the mold cavity 18 now ensure uniform distribution of the facing concrete with simultaneous curing of the core concrete 56.

After raising of the pressing plate 59 in the upper mold 47, the product is finished. The next light-conducting mat 1 is inserted into the pressing apparatus immediately thereafter and fixed by means of a vacuum.

To remove the finished light-conducting body 21 from the mold, the finished slab is pressed out of the metal mold via plungers not shown in any more detail, with a light pressure in the downward direction, wherein the finished light-conducting body is placed on another base plate and is transferred by a fully automatic system for further processing (drying, sandblasting, impregnating and packaging).

FIGS. 15 and 16 show the method steps for carrying out the method according to the subject matter of independent claim 11.

FIG. 15 shows, in a perspective view, a pressing plate 59 perforated by a number of slots 19 which extend through the entire cross-section of the pressing plate 59.

The pressing plate 59 is shown in cross-section in FIG. 16, and it can be seen that the width and the profile of the slots 19 approximately correspond to the profile of the light-conducting elements 4 of the light-conducting mat 1.

The light-conducting mat 1, with its bottom side, is placed on the bottom 28 of the casting mold 27 and anchored there.

Then the casting material 66 is poured in until an overfill 67 has been created above the light-conducting elements 4 in the casting mold 27.

Then the pressing plate 59 is moved downwards in the arrow direction 63 so that the light-conducting elements 4 partially penetrate the slots 19 of the pressing plate 59, which is not absolutely necessary, however, to achieve the desired result.

It can also be provided that the underside of the pressing plate 59 is only lowered into the casting mold 27 by the amount of the overfill 67 and the light-conducting elements 4 do not penetrate into the slots 19.

In this case, the slots 19 only serve for draining the displaced overfill 67 to the outside, with the additional possibility of extracting water.

The present is preferably a single-layer concrete method, and the filling level of the casting mold 27 is 10 percent higher than the height of the finished slab.

Subsequently, the pressing plate 59, with its slots 19, is pressed into the mold cavity 18. It can also be additionally vibrated to better compact the concrete.

The concrete overlying the light conductors in the area of the overfill 67 is not compressed. Then, the non-compressed concrete is removed (precisely above the light conductors) and the slab is finished.

In accordance with the exemplary embodiments yet to be described it may also be provided that the bottom 28 of the casting mold 27 is not rigid but elastically deformable.

In a further development of the independent method claim 11 in accordance with FIGS. 15 and 16, it can be additionally provided according to FIGS. 17 and 18 that the light-conducting mat 1 is not just simply placed on the bottom 28 of the casting mold 27 but that a bottom-side profile 28 is provided which is complementary to the profile of the light-conducting mat 1 to be engaged therewith.

In accordance with FIGS. 17 and 18, the light-conducting mat 1 is thus always placed and fixed on the bottom 28 of the casting mold 27 in a manner that is positionally secure and secure against displacement.

The retaining profile 68 preferably consists of a metal or plastic material.

When designing this retaining profile 68 it is important that all profile parts are formed in such a manner that they engage with the associated profile recesses of the light-conducting mat to be fitted in an interlocking manner and thus provide for sealing against the ingress of cement slurries.

Thus, it can be seen from FIG. 18, for example, that the channels 65 for the insertion of cables into the embedded light-conducting mat 1 and further negative molds 69 are present which seal off the profile channel 10 of the light-conducting element 4 in an interlocking manner.

In accordance with the subject matter of independent method claim 15, in a further development of the invention, it is suggested that it is not the light-conducting mat 1 that is placed and anchored in the mold cavity 18 of the casting mold 27 at the bottom, but a placeholder is placed in the mold instead, which is only removed from the casting material after the slab-like casting material is cured.

For this purpose, the exemplary embodiment according to FIGS. 19 to 22 provides that a negative mold 70 preferably of metal sections, is present which exactly corresponds to the profile of the light-conducting mat 1.

Parts of the slab 71 are therefore also present which correspond to the later light-conducting elements 4 of the light-conducting mat 1. All other placeholders are also present so that when the slab has cured it becomes possible to remove the negative mold 70 from the cured slab material and to then insert the light-conducting mat 1 into the cavities thus created.

For this purpose, FIG. 21 shows such a negative mold 70 consisting of metal sections which, in its profile shape, exactly corresponds to the light-conducting mat 1 to be inserted later.

Therefore, hollow sections 72 are also present which are provided for the later insertion of the channels 10 of the light-conducting mat 1, and all other parts are also present, such as a hollow section 73 for the later routing of a cable channel of the light-conducting mat 1 and the like.

FIG. 21 shows that such a negative mold 70 can be anchored directly at the bottom 28 of the casting mold 27.

FIG. 22, however, as a modification of the exemplary embodiment in accordance with FIG. 21, shows that a bottom-side retaining profile 68, on which the negative mold 70 is fitted and fixed can be provided in addition to the positional securing of the negative mold 70.

This thus always ensures positionally secure fixing of the negative mold 70 at the bottom 28 of the casting mold 27.

According to FIG. 20, after fixing the negative mold 70 at the bottom 28 of the casting mold 27, the pressing plate 59 is now moved downwards in the arrow direction 63, and the slots 19 are dimensioned such that they at least partially overlap the slab portions 71 of the negative mold 70 and thus penetrate the slots 19.

The curable substance 66 is then compressed, resulting in the cured slab-like parts, from which the negative mold 70 is then removed, and the light-conducting mat 1 is then inserted in the thus created cavities in the cured slab part.

As already mentioned in the general description, a so-called expendable mold can be used, wherein the negative mold 70 is not of metal material, but is formed as a wax pattern, for example, and is also enclosed in the casting material in the described manner.

After curing is complete, the cured slab undergoes heat treatment for a short time until the wax drips out of the cavities and the light-conducting mat 1 can be inserted and anchored in the now freed cavities.

FIGS. 23 to 25 describe a method sequence in accordance with independent claim 17, where it can be seen that suitable negative molds 29 for the releasable attachment of profile parts of the light-conducting mat 1 are arranged at the underside of a molding punch 24. The light-conducting mat is thus anchored on the negative mold 69 and, according to FIG. 24, the thus equipped molding punch 74 is lowered into the casting mold 27 shown in FIG. 25, which has already been filled with the not yet cured casting material 66.

A displacement effect occurs during lowering and when the light-conducting mat 1 penetrates the casting material 66, so that displaced casting material and any surplus water have to be extracted and removed.

In such a method it is advantageous for the circumferential edges of the light-conducting elements 4 to be rounded because this leads to an improved displacement effect of the casting material.

To simplify the description; it has been omitted to show that a number of slots can be present in the molding punch 74 through which the displaced casting material drains.

Incidentally, it can also be provided that the profile channels 10 of the light-conducting mat and all other parts are suitably rounded to enable better penetration into the casting material 66.

Furthermore, it is preferred for the bottom 28 of the casting mold 27 to be formed so that it is elastically deformable; because it is then able to bulge out elastically in a convex manner when the end-side edges of the light-conducting elements 4 are placed and abut on the bottom 28 thus resulting in a displacement effect because grains of sand and cement slurries deposited on the end faces of the light-conducting elements 4 are thus displaced.

The elastic configuration of the bottom 28 also ensures that the light-emitting end faces 6 of the light-conducting elements 4 remain free of sand and cement substrates during the curing process and slightly protrude from the cured slab and can thus be more easily further processed.

Regardless of which method of manufacture is used, it is always possible to press the parts to be produced with oversize and to reduce the surface by means of postprocessing, such as grinding, sandblasting etc. to a point where the finished height results after processing.

When the part is pressed with oversize, i.e. the filling level is about 20 percent higher than the finished height, pressing is conducted to an oversize of about 10 percent, and these 10 percent are then ground off.

This is also possible, of course, with a pressing plate that is not provided with holes (recesses such as in the injection casting mold), which means that the plate is simply planar.

LEGEND OF THE DRAWINGS 1 light-conducting mat
2 longitudinal web
3 transverse web
4 light-conducting element
5 light channel
6 end face (of 4)
7 side surface
8 bottom surface
9 snap-in tab
10 profile channel
11
12 light rod
13 arrow direction
14 arrow direction
15 arrow direction
16 arrow direction
17 casting mold platen
18 mold cavity
19 slot
20 LED element
21 light-conducting body
22 top side
23 end face (of 32)
24 round table
25 side wall (of 27)
26 front and rear wall (of 27)
27 casting mold
28 bottom (of 27)
29 pressing plate (upper part)
30 retaining profile (of 29)
31 arrow direction
32 molding punch (lower part)
33 lower part
34 end face (of 21)
35 upper mold
36 first casting material (facing concrete)
37 pressure plate
38 plunger
39 filling device
40 tube
41 arrow direction
42 metal plate
43 top edge (of 42)
44 inside
45 outside
46 lower mold
47 upper mold
48 plunger (of 47)
49 arrow direction
50 recess
51 vibrating plate
52 vibrating punch
53 abrasive tool
54 brushing tool
55 conveyor
56 second casting material (core concrete)
57 arrow direction
58 feeding unit
59 pressing plate
60 arrow direction
61 end face (of 32)
62 centering tab
63 arrow direction
64 side wall
65 channel for cables in 1
66 casting material

The invention claimed is:

1. A method for manufacturing a curable light-conducting body in a casting method, wherein
   a) in a first method step, a mold cavity of a casting mold is filled with a curable casting material,
   b) in a second method step, a light-conducting mat to be embedded in the casting material is fixed on an underside of a molding punch to be pressed into the casting mold,
   c) in a third method step, the molding punch moves into the mold cavity with the light-conducting mat fixed at its underside and thereby presses the light-conducting mat into the casting material.

2. A casting mold for carrying out the method according to claim 1, comprising a retaining profile is-arranged at the underside of the molding punch which, as a negative mold, is complementary to a bottom-side profile of the light-conducting mat.

3. The method according to claim 1, wherein the light-conducting mat comprises light-conducting elements having circumferentially rounded edges.

4. The method according to claim 1, wherein the light-conducting mat comprises rounded profile channels.

5. The method according to claim 3, wherein the casting mold comprises an elastically deformable bottom, so that when end-side edges of the light-conducting elements are set and abut on the bottom, the bottom bulges out in a convex manner.

6. The method according to claim 5, wherein, due to the elastically deformable bottom, light emitting end faces of the light-conducting elements remain free of sand and cement substrates during a curing process and afterwards slightly protrude from a cured slab and can thus be more easily further processed.

7. The casting mold according to claim 2, wherein the casting mold comprises a bottom having a soft, elastic surface.

8. The casting mold according to claim 2, wherein a number of slots are present in the molding punch, through which displaced casting material is drained.

* * * * *